US012184897B2

(12) United States Patent
Nakagami

(10) Patent No.: US 12,184,897 B2
(45) Date of Patent: *Dec. 31, 2024

(54) IMAGE PROCESSING APPARATUS AND IMAGE PROCESSING METHOD

(71) Applicant: SONY GROUP CORPORATION, Tokyo (JP)

(72) Inventor: Ohji Nakagami, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/345,788

(22) Filed: Jun. 30, 2023

(65) Prior Publication Data

US 2023/0353786 A1 Nov. 2, 2023

Related U.S. Application Data

(63) Continuation of application No. 16/323,183, filed as application No. PCT/JP2017/025021 on Jul. 7, 2017, now Pat. No. 11,722,698.

(30) Foreign Application Priority Data

Aug. 24, 2016 (JP) ................. 2016-163718

(51) Int. Cl.
H04N 19/61 (2014.01)
H04N 19/124 (2014.01)
(Continued)

(52) U.S. Cl.
CPC .......... *H04N 19/61* (2014.11); *H04N 19/124* (2014.11); *H04N 19/176* (2014.11); *H04N 19/45* (2014.11)

(58) Field of Classification Search
CPC .... H04N 19/176; H04N 19/61; H04N 19/124; H04N 19/70; H04N 19/593; H04N 19/46;
(Continued)

(56) References Cited

U.S. PATENT DOCUMENTS

2004/0125204 A1 7/2004 Yamada et al.
2010/0086028 A1 4/2010 Tanizawa et al.
(Continued)

FOREIGN PATENT DOCUMENTS

BR PI0809255 A2 9/2014
CA 2680140 A1 11/2008
(Continued)

OTHER PUBLICATIONS

International Organization For Standardization: "Algorithm Description of Joint Exploration Test Model 1 (JEM1 )", 113. MPEG Meeting; Oct. 19, 2015-Oct. 23, 2015; Geneva; (Motion Picture Expert Group or ISO/IEC JTC1/SC29/WG11 ),No. n15790, Dec. 11, 2015 (Dec. 11, 2015), XP030022473.
(Continued)

*Primary Examiner* — Farhan Mahmud
(74) *Attorney, Agent, or Firm* — CHIP LAW GROUP

(57) ABSTRACT

In image encoding, to raise the degree of concentration of coefficient energy, there is disclosed the application of a secondary transform different from a primary transform to the transform coefficients after the primary transform. Since the transform coefficients after multiple transforms are applied may be transformed to a different domain than the frequency domain with respect to the original image characteristics, bandwidth control using a scaling list for the frequency domain (quantization matrix) is affected. Consequently, even in the case in which multiple transforms are applied, it is an object to provide a mechanism enabling bandwidth control using a scaling list. To achieve the above
(Continued)

object, the present invention provides an image processing apparatus including a process control section that controls a scaling list process on the basis of transform information related to a transform applied to a processing target block and an image processing method.

12 Claims, 23 Drawing Sheets

(51) Int. Cl.
*H04N 19/176* (2014.01)
*H04N 19/44* (2014.01)

(58) Field of Classification Search
CPC ...... H04N 19/60; H04N 19/18; H04N 19/117; H04N 19/136
See application file for complete search history.

(56) References Cited

U.S. PATENT DOCUMENTS

| | | | |
|---|---|---|---|
| 2014/0050262 A1 | 2/2014 | Sakurai et al. | |
| 2014/0056362 A1 | 2/2014 | Mrak et al. | |
| 2014/0247866 A1* | 9/2014 | Lee | H04N 19/44 375/240.02 |
| 2015/0334396 A1* | 11/2015 | Lim | H04N 19/463 375/240.03 |

FOREIGN PATENT DOCUMENTS

| | | | |
|---|---|---|---|
| CN | 1496653 A | 5/2004 | |
| CN | 101622881 A | 1/2010 | |
| CN | 102883249 A | 1/2013 | |
| CN | 103404141 A | 11/2013 | |
| CN | 103503452 A | 1/2014 | |
| CN | 105847815 A | 8/2016 | |
| EP | 1370087 A1 | 12/2003 | |
| EP | 2136566 A1 | 12/2009 | |
| EP | 2652954 A2 | 10/2013 | |
| EP | 3026911 A1 | 6/2016 | |
| ES | 2574278 T3 | 6/2016 | |
| GB | 2492333 A | 1/2013 | |
| JP | 2003-204550 A | 7/2003 | |
| JP | 2012-238927 A | 12/2012 | |
| JP | 2013-038768 A | 2/2013 | |
| JP | 2013-038769 A | 2/2013 | |
| JP | 6063935 B2 | 1/2017 | |
| JP | 6328220 B2 | 5/2018 | |
| KR | 10-0767557 B1 | 10/2007 | |
| KR | 10-2009-0115176 A | 11/2009 | |
| KR | 10-2013-0130595 A | 12/2013 | |
| KR | 10-2014-0027932 A | 3/2014 | |
| NO | 20033932 L | 10/2003 | |
| PL | 2652954 T3 | 10/2016 | |
| PT | 2652954 E | 6/2016 | |
| RU | 2009135396 A | 4/2011 | |
| TW | 200850013 A | 12/2008 | |
| TW | 201320751 A | 5/2013 | |
| WO | 2003/058974 A1 | 7/2003 | |
| WO | 2008/132890 A1 | 11/2008 | |
| WO | 2011/016248 A1 | 2/2011 | |
| WO | 2011/108240 A1 | 9/2011 | |
| WO | 2012/153578 A1 | 11/2012 | |
| WO | 2013/001278 A1 | 1/2013 | |
| WO | 2013/001279 A2 | 1/2013 | |

OTHER PUBLICATIONS

Advisory Action Office Action for U.S. Appl. No. 16/323,183, issued on May 24, 2022, 5 pages.
Peng, et al., "Inter Transform Skipping", Joint Collaborative Team on Video Coding (JCT-VC) of ITU- T SG 16 WP 3 and ISO/IEC JTC 1/SC 29/WG 11, 10th Meeting: Stockholm, SE, Jul. 11-20, 2012, pp. 1-4.
Morigami, et al., "On Transform Skip", Joint Collaborative Team on Video Coding (JCT /VC) of ITU-T SG 16 WP 3 and ISO/IEC JTC 1/SC 29/WG 11, 10th Meeting: Stockholm, SE, Jul. 11-20, 2012, pp. 1-11.
Zhao, et al., "De-quantization and scaling for next generation containers", Joint Video Exploration Team (JVET) of ITU-TSG 16 WP3, ISO/IEC JTC 1-/SC 29/WG 11 and 2nd Meeting: San Diego, Feb. 20-26, 2016, pp. 1-5.
Chen, et al., "Algorithm Description of Joint Exploration Test Model 3", Joint Video Exploration Team (JVET) of ITU-TSG 16 WP3, ISO/IEC JTC1/SC 29/WG 11, 3rd Meeting: Geneva, CH, Jul. 2016, pp. 1-34.
Office Action for JP Patent Application No. 2018-535510, issued on Jun. 22, 2021, 6 pages of Office Action and 7 pages of English Translation.
Office Action for KR Patent Application No. 10-2019-7002681, issued on Oct. 1, 2021, 06 pages of English Translation and 05 pages of Office Action.
Chen, et al., "Algorithm Description of Joint Exploration Test Model 3", Joint Video Exploration Team of ITU-T SG 16 WP 3 and ISO/IEC JTC 1/SC 29/WG 11, 3rd Meeting, Geneva, JVET-C1001, vol. 3, May 26-Jun. 1, 2016, 37 pages.
Final Office Action for U.S. Appl. No. 16/323,183, issued on Feb. 17, 2022, 8 pages.
Tsukuba, et al., "EE2.7-Related: On Secondary Transform When Primary Transform is Skipped", Joint Video Exploration Team (JVET) of ITU-T SG 16 WP 3 and ISO/IEC JTC 1/SC 29/WG 11, 3 Meeting, Geneva, JVET-C0045_r1, May 26-Jun. 1, 2016, 6 pages.
Non-Final Office Action for U.S. Appl. No. 16/323,183, issued on Aug. 5, 2021, 9 pages.
Office Action for EP Patent Application No. 17843224.1, issued on Feb. 11, 2021, 4 pages of Office Action.
Sharman, et al., "Transform Skip and Scaling Lists", Joint Collaborative Team on Video Coding (JCT-VC) of ITU-T SG16 WP3 and ISO/IEC JTC1/SC29/WG11, 15th Meeting, Geneva, CH, Oct. 23-Nov. 1, 2013, 05 pages.
Extended European Search Report of EP Application No. 17843224. 1, issued on Jul. 10, 2019, 08 pages.
International Search Report and Written Opinion of PCT Application No. PCT/JP2017/025021, issued on Sep. 12, 2017, 07 pages of English Translation and 08 pages of ISRWO.
Non-Final Office Action for U.S. Appl. No. 16/323,183, issued on Aug. 31, 2022, 7 pages.
Office Action for JP Patent Application No. 2018-535510, issued on Apr. 13, 2021, 04 pages of English Translation and 04 pages of Office Action.
Notice of Allowance for U.S. Appl. No. 16/323,183, issued on Mar. 23, 2023, 8 pages.
International Preliminary Report on Patentability of PCT Application No. PCT/JP2017/025021, issued on Mar. 7, 2019, 07 pages of English Translation and 04 pages of IPRP.

* cited by examiner

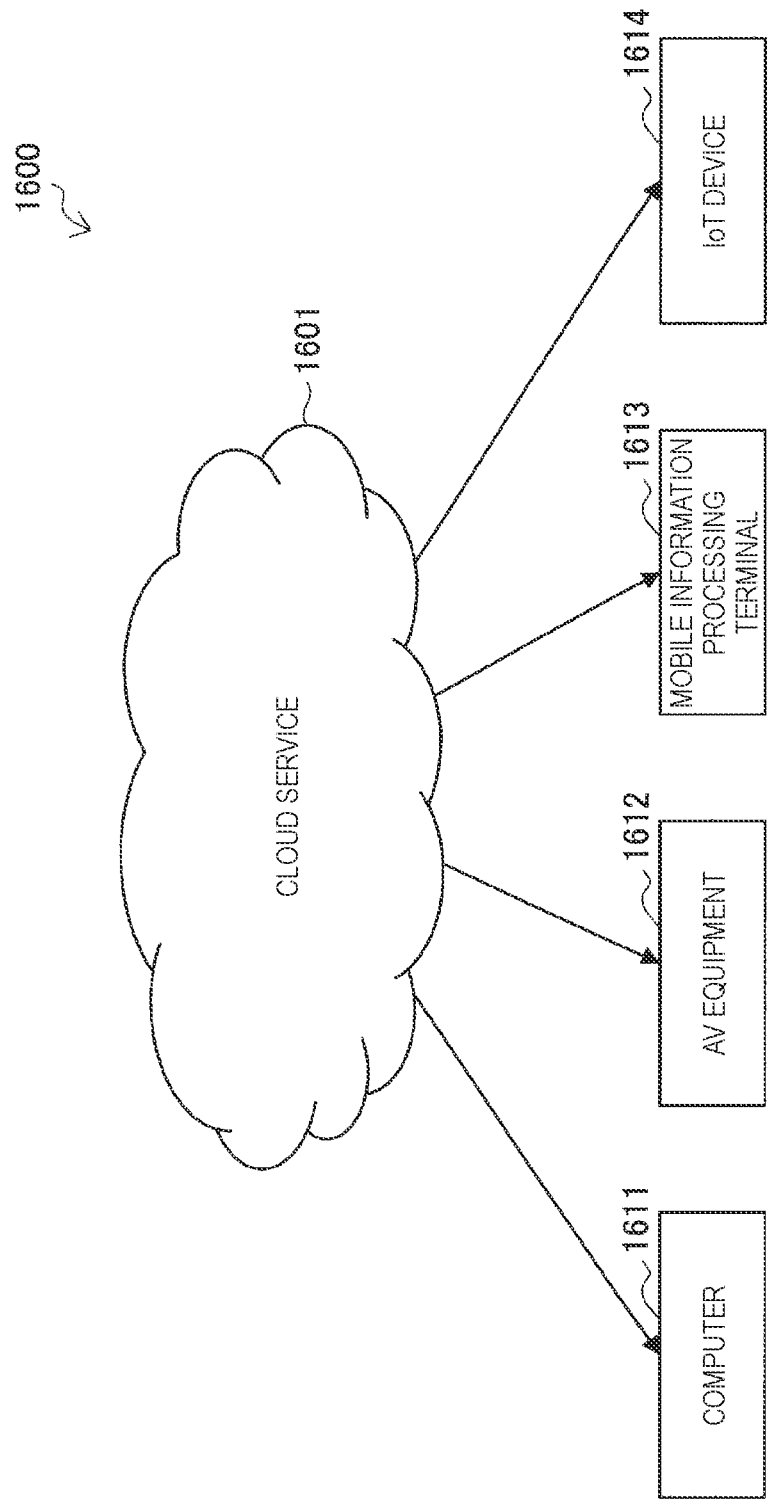

IMAGE PROCESSING APPARATUS AND IMAGE PROCESSING METHOD

CROSS REFERENCE TO RELATED APPLICATIONS

This application is a continuation application of U.S. patent application Ser. No. 16/323,183 filed on Feb. 4, 2019, which is a U.S. National Phase of International Patent Application No. PCT/JP2017/025021 filed on Jul. 7, 2017, which claims priority benefit of Japanese Patent Application No. JP 2016-163718 filed in the Japan Patent Office on Aug. 24, 2016. Each of the above-referenced applications is hereby incorporated herein by reference in its entirety.

TECHNICAL FIELD

The present disclosure relates to an image processing apparatus, an image processing method, and a program.

BACKGROUND ART

In image coding, to raise the degree of concentration of coefficient energy (concentrate the transform coefficients at low frequencies), the application of a secondary transform different from the primary transform to the transform coefficients after the primary transform has been disclosed (for example, see Non-Patent Literature 1).

CITATION LIST

Non-Patent Literature

Non-Patent Literature 1: Jianle Chen, Elena Alshina, Gary J. Sullivan, Jens-Rainer Ohm, Jill Boyce, "Algorithm Description of Joint Exploration Test Model 3", JVET-C1001_v3, Joint Video Exploration Team (JVET) of ITU-T SG 16 WP 3 and ISO/IEC JTC 1/SC 29/WG 11 3rd Meeting: Geneva, CH, 26 May-1 Jun. 2016

DISCLOSURE OF INVENTION

Technical Problem

However, like in Non-Patent Literature 1, since the transform coefficients after multiple transforms are applied may be transformed to a different domain than the frequency domain with respect to the original image characteristics, bandwidth control using a scaling list for the frequency domain (quantization matrix) is affected.

Consequently, even in the case in which multiple transforms are applied, it is desirable to provide a mechanism enabling bandwidth control using a scaling list.

Solution to Problem

According to the present disclosure, there is provided an image processing apparatus including: a process control section that controls a scaling list process on the basis of transform information related to a transform applied to a processing target block.

In addition, according to the present disclosure, there is provided an image processing method including: controlling, by a processor, a scaling list process on the basis of transform information related to a transform applied to a processing target block of a processing target.

In addition, according to the present disclosure, there is provided a program causing a computer to execute a function of: controlling a scaling list process on the basis of transform information related to a transform applied to a processing target block.

Advantageous Effects of Invention

According to the present disclosure as described above, bandwidth control using a scaling list becomes possible even in the case in which multiple transforms are applied.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 24 is a block diagram illustrating one example of a schematic configuration of a network system.

MODE(S) FOR CARRYING OUT THE INVENTION

Figure 1:
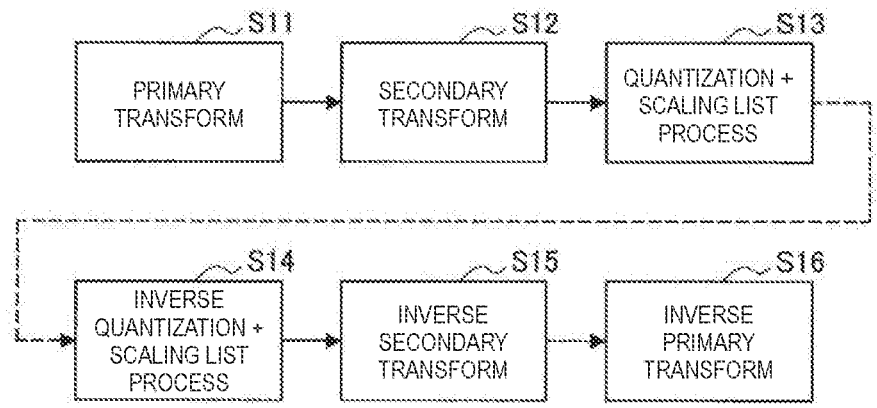
FIG. 1 is an explanatory diagram that schematically illustrates a flow of an existing process according to a scaling list process.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.
Hereinafter, the description will proceed in the following order.
 1. First Embodiment
 2. Second Embodiment
 3. Hardware configuration example
 4. Application examples
 5. Conclusion

1. First Embodiment

1-1. Overview

For example, to raise the degree of concentration of coefficient energy (concentrate the transform coefficients at low frequencies), Non-Patent Literature 1 discloses the application of a secondary transform to the transform coefficients after applying a primary transform that transforms to the frequency domain. However, since the transform coefficients after multiple transforms are applied may be transformed to a different domain than the frequency domain with respect to the original image characteristics, bandwidth control using a scaling list for the frequency domain (scaling list process) is affected.

FIG. 1 is an explanatory diagram that schematically illustrates a flow of an existing process according to a scaling list process in the case of applying a secondary transform to transform coefficients after a primary transform.

As illustrated in FIG. 1, a secondary transform (S12) is applied to the transform coefficients after a primary transform (S11) is applied. Next, a quantization process and scaling list process (S13) are performed on the transform coefficients after the secondary transform. The above is the process when encoding.

Next, when decoding, an inverse quantization and scaling list process (S14) is performed, then an inverse secondary transform (S15) is performed, and additionally, an inverse primary transform (S16) is applied.

As described above, with the method described in Non-Patent Literature 1, the (inverse) quantization process and the scaling list process are performed simultaneously or consecutively. For example, in High Efficiency Video Coding (HEVC), the inverse quantization process and the scaling list process are performed simultaneously. Hereinafter, the scaling list process during decoding in HEVC will be described.

In HEVC, the inversely quantized transform coefficient value d[x][y] at a position (x, y) inside a process block is computed as in the following Formula (1) using a scaling factor m[x][y], which is the value of an element corresponding to the position (x, y) in the scaling list.

[Math. 1]

$$d[x][y] = \text{Clip3}(\text{coeffMin}, \text{coeffMax}, ((\text{TransCoeffLevel}\\ [xTbY][yTbY][cIdx][x][y] * m[x][y] * \text{levelScale}\\ [qP\%6] << (qP/6)) + (1 << (bd\text{Shift}-1))) >> bd\text{Shift}) \quad (1)$$

In Formula (1), TransCoeffLevel[xTbY][yTbY][cIdx][x][y] represents the quantized level value (quantized data) at the position (x, y) in the process block. Also, in Formula (1), levelScale[qP %6]<<(qP/6) and (1<<(bdShift-1)))>>bdShift) are values related to a quantization process using a quantization parameter qP. Also, Clip3(coeffMin, coeffMax, X) means a value obtained by rounding a numerical value X to be equal to or greater than a coefficient minimum value coeffMin and to be equal to or less than a coefficient maximum value coeffMax.

Figure 2:
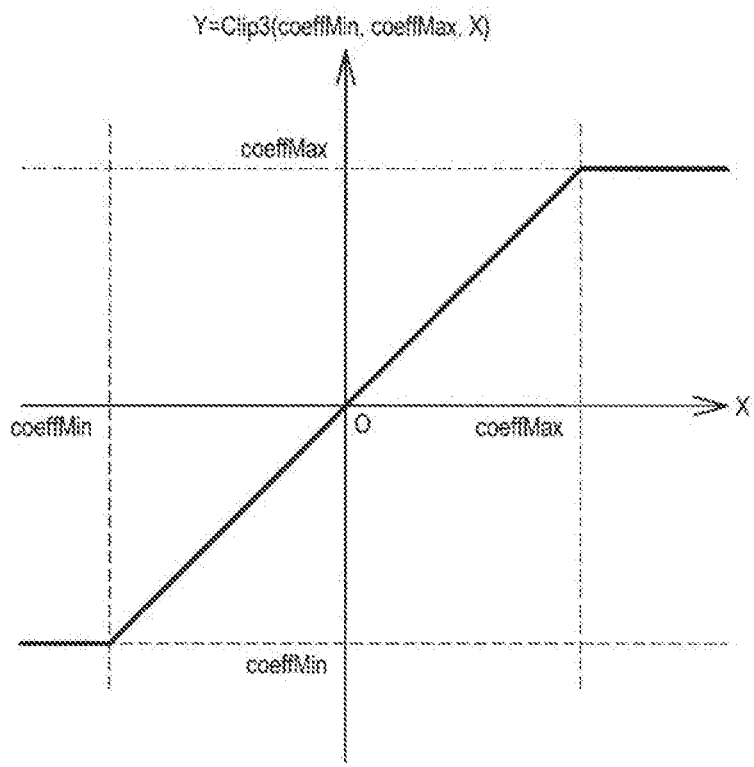
FIG. 2 is a graph of Y=Clip3(coeffMin, coeffMax, X).

FIG. 2 is a graph of Y=Clip3(coeffMin, coeffMax, X). As illustrated in FIG. 2, the value of Clip3(coeffMin, coeffMax, X) is equal to or greater than coeffMin, and also equal to or less than coeffMax.

As illustrated in Formula (1), in HEVC, during the inverse quantization process, the scaling list process has been performed by multiplying by the scaling factor m[x][y] according to the scaling list. Also, similarly, in HEVC, the quantization and scaling list processes have been performed simultaneously.

However, the transform coefficients after applying the secondary transform, namely a rotation matrix, described in Non-Patent Literature 1 for example, are transformed to a different domain than the frequency domain with respect to the original image characteristics. Consequently, in the case of using a scaling list for the frequency domain to perform the scaling list process as part of the (inverse) quantization process, executing appropriate bandwidth control is difficult.

Accordingly, focusing on the above circumstances led to the creation of an embodiment of the present disclosure. An image encoding apparatus or image decoding apparatus according to the present embodiment enables bandwidth control through a scaling list process by controlling the transform process or the scaling list process on the basis of transform information.

Figure 3:
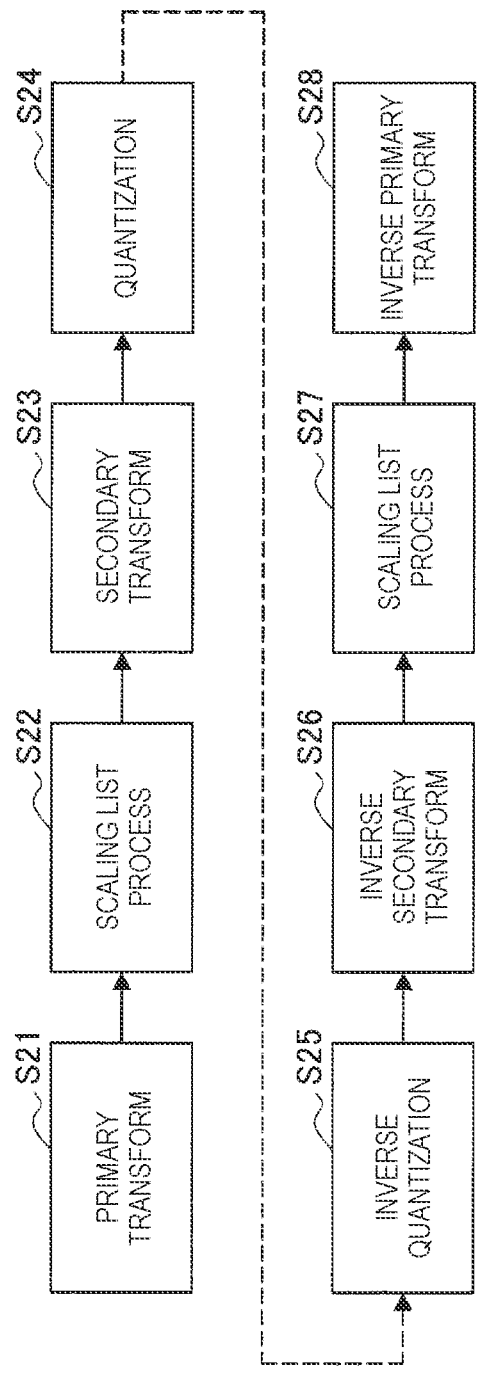
FIG. 3 is an explanatory diagram that schematically illustrates a flow of a process according to a first embodiment of the present disclosure.

FIG. 3 is an explanatory diagram that schematically illustrates a flow of a process according to the present embodiment. As illustrated in FIG. 3, in the present embodiment, a scaling list process (S22) is performed on the transform coefficients after a primary transform (S21) is applied. Next, after a secondary transform (S23) is applied to the coefficients after the scaling list process, a quantization process (S24) using the quantization parameter qP is performed. The above is the process when encoding.

Next, when decoding, first, an inverse quantization process (S25) is performed, and then an inverse secondary transform (S26) is applied. Additionally, after a scaling list process (S27) is performed, an inverse primary transform (S28) is applied.

As illustrated in FIG. 3, in the present embodiment, by performing the scaling list process immediately after the primary transform, the scaling list process is performed on data existing in the frequency domain with respect to the original image characteristics, thereby making possible bandwidth control through the scaling list.

Note that the number of transforms according to the present embodiment is not limited to the two of the primary transform and the secondary transform, and may be a greater number (3 or more). For example, if the processes during encoding and decoding illustrated in FIG. 1 are generalized to a greater number of transform processes, it is possible to express each as in the following Formulas (2) and (3), respectively.

$$C=Q(SL(Fn^* \ldots F2^*F1(R))) \quad (2)$$

$$R=(F'1^*F'2^* \ldots F'n^*SL'(DQ(C))) \quad (3)$$

Note that C means the quantized data, Q is the quantization process, SL is the scaling list process when encoding, F1 is the primary transform (such as the DCT or the DST), F2 is the secondary transform, Fn is the nth transform, * is the convolution operation, and R is a residual image. Also, F'a means the inverse transform of Fa, and SL' means the scaling list process when decoding.

Also, if the processes during encoding and decoding according to the present embodiment illustrated in FIG. 3 are generalized to a greater number of transform processes, it is possible to express each as in the following Formulas (4) and (5), respectively.

$$C=Q^*Fn^* \ldots F2^*SL(F1(R)) \quad (4)$$

$$R=(F'1^*SL(F'2^* \ldots F'n^*DQ(C))) \quad (5)$$

According to the present embodiment, even if the number of transforms is 3 or more, by performing the scaling list process immediately after the primary transform like in Formulas (4) and (5) above, bandwidth control through a scaling list becomes possible.

Note that in the present embodiment, the inversely quantized transform coefficient value dn is expressed as in the following Formula (6). Herein, the transform coefficient value dn is the transform coefficient value for the nth inverse transform.

[Math. 2]

$$dn[x][y](\text{coeffMin},\text{coeffMax},((\text{TransCoeffLevel}[xTbY][yTbY][x]^*\text{levelScale}[qP\%6](<<(qP/6))+(1<<(bd\text{Shift}-1)))>>bd\text{Shift}) \quad (6)$$

As in Formula (6) above, in the inverse quantization process in the present embodiment, a process using the quantization parameter qP is performed, without using the scaling factor m[x][y].

Also, in the present embodiment, the transform coefficient value d0 for the inverse primary transform obtained by the scaling list process when decoding is expressed as in the following Formula (7).

[Math. 3]

$$d0[x][y]=\text{Clip3}(\text{coeffMin},\text{coeffMax},((d1[xTbY][yTbY][cIdx][x][y]^*m[x][y])) \quad (7)$$

Herein, d1[xTbY][yTbY][cIdx][x][y] means the coefficient value after the inverse secondary transform. Note that in the case in which the number of transforms is 1 (only the primary transform), the transform coefficient value d0[x][y] obtained by Formulas (6) and (7) is basically the same result as the transform coefficient value d[x][y] obtained by Formula (1). However, in the case in which the quantized level value (quantized data) TransCoeffLevel[xTbY][yTbY][cldx][x][y] is not contained in the range between coeffMin and coeff Max, the two results may be different.

The above describes an overview of the present embodiment. Next, a configuration and a process flow according to the present embodiment will be described. Note that, for the sake of simplicity, the following describes an example in which the number of transforms to be applied is at most 2, but as described above, the number of transforms according to the present embodiment is not limited to such an example, and may also be 3 or more.

1-2. Configuration of Image Encoding Apparatus

(1) Overall Configuration

Figure 4:
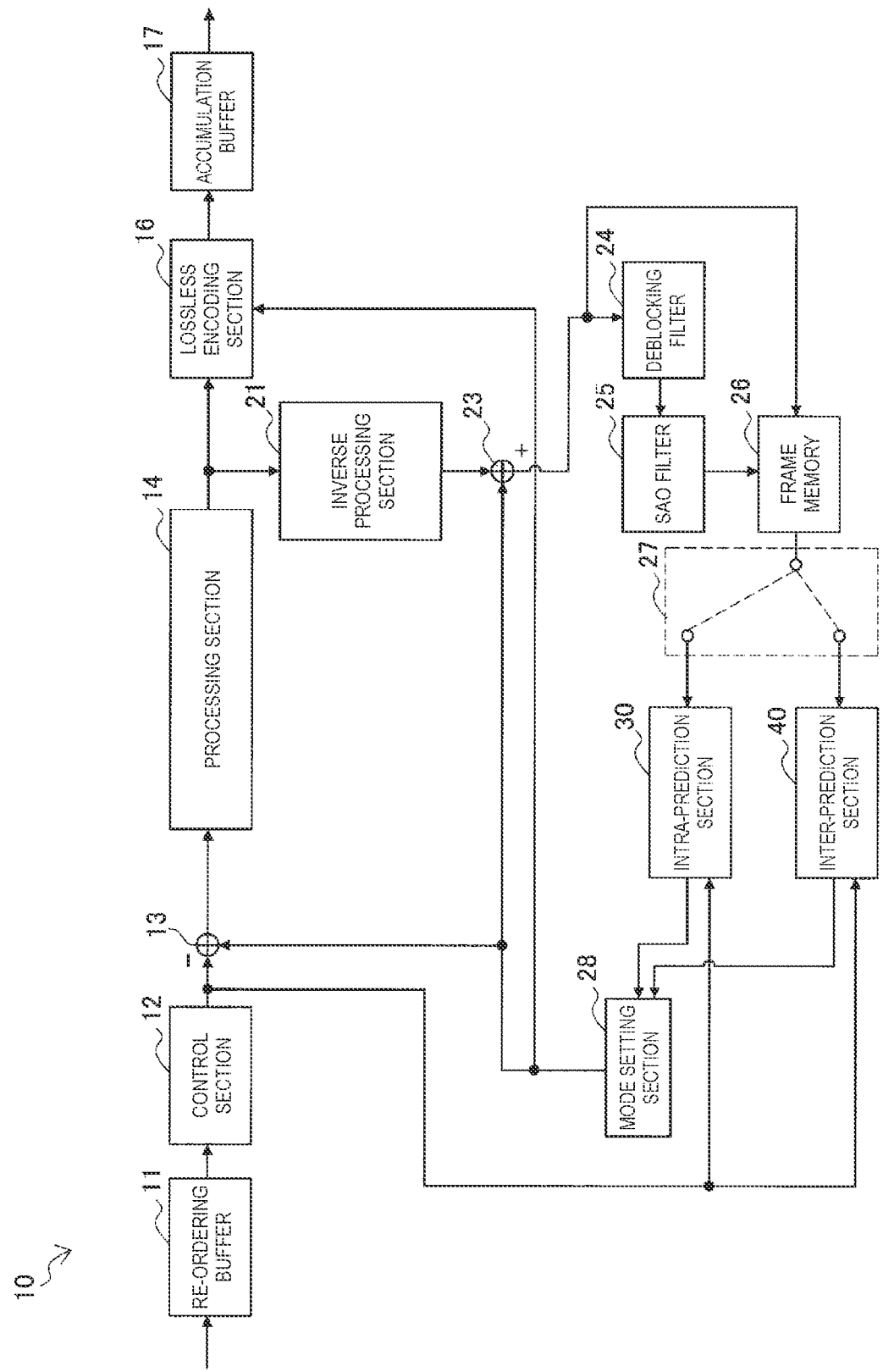
FIG. 4 is a block diagram illustrating one example of a configuration of an image encoding apparatus 10 according to the embodiment.

FIG. 4 is a block diagram illustrating one example of the configuration of an image encoding apparatus 10, which is one aspect of an image processing apparatus according to the present embodiment. Referring to FIG. 4, the image encoding apparatus 10 is provided with a re-ordering buffer 11, a control section 12, a subtraction section 13, a processing section 14, a lossless encoding section 16, an accumulation buffer 17, an inverse processing section 21, an addition section 23, a deblocking filter 24, an SAO filter 25, frame memory 26, a switch 27, a mode setting section 28, an intra-prediction section 30, and an inter-prediction section 40.

The re-ordering buffer 11 re-orders the image data of a series of images included in video to be encoded, in accordance with a Group of Pictures (GOP) structure according to the encoding process. The re-ordering buffer 11 outputs the re-ordered image data to the control section 12, the subtraction section 13, the intra-prediction section 30, and the inter-prediction section 40.

The control section 12 decides encoding parameters to be supplied to each section on the basis of rate-distortion optimization (RDO), for example. The decided encoding parameters are supplied to each block.

For example, the encoding parameters may include transform information related to a transform to be applied to a processing target transform block. For example, the transform information may include information indicating whether or not a secondary transform is to be applied to a processing target transform block (for example, see JVET-B1001, 2.5.2 Secondary Transforms). Also, the transform information may include information indicating the number of transforms to be applied to a processing target transform block. Also, the transform information may include information indicating a type of transform to be applied to a processing target transform block.

Also, the encoding parameters may include scaling list information (for example, JCTVC-W1005, 7.3.4 Scaling list data syntax) that indicates the scaling list to be used in the scaling list process. Also, the encoding parameters may include a quantization parameter (qP) to be used in (inverse) quantization.

Note that the encoding parameters decided by the control section 12 may be any parameters, and may include a variety of information not limited to the information described above. The encoding parameters may include block information indicating how the coding tree unit (CTU), coding unit (CU), transform unit (TU), prediction unit (PU), and the like of HEVC should be set, information related to intra-prediction, and information related to inter-prediction.

The subtraction section 13 calculates prediction error data, which is the difference between the image data input from the re-ordering buffer 11 and the predicted image data, and outputs the calculated prediction error data to the processing section 14.

The processing section 14 executes an orthogonal transform process, the scaling list process, and the quantization process on the basis of the transform information, scaling list information, quantization parameter, and the like input from the control section 12. The processing section 14 outputs the data after quantization (hereinafter called the quantized data) to the lossless encoding section 16 and the inverse processing section 21. Note that a more detailed configuration of the processing section 14 will be further described later.

The lossless encoding section 16 generates an encoded stream by encoding quantized data input from the processing section 14. In addition, the lossless encoding section 16 encodes the encoding parameters decided by the control section 12, and inserts the encoded parameters into the header area of the encoded stream. The lossless encoding section 16 outputs the generated encoded stream to the accumulation buffer 17.

The accumulation buffer 17 uses a storage medium such as semiconductor memory to temporarily buffer the encoded stream input from the lossless encoding section 16. Subsequently, the accumulation buffer 17 outputs the buffered encoded stream to a transmission section not illustrated (such as a communication interface or a connection interface that connects with peripheral equipment, for example), at a rate according to the bandwidth of the transmission channel.

The inverse processing section 21 and the addition section 23 form a local decoder. The local decoder takes a role of reconstructing an original image from encoded data.

The inverse processing section 21 executes the inverse process of the process executed by the processing section 14. For example, the inverse processing section 21 reconstructs the prediction error data by executing an inverse quantization process, a scaling list process, and an inverse orthogonal transform process on the basis of transform information, scaling list information, quantization parameter, and the like input from the control section 12. Subsequently, the inverse processing section 21 outputs the reconstructed prediction error data to the addition section 23. Note that the inverse processes (inverse quantization process, scaling list process, and inverse orthogonal transform process) executed by the inverse processing section 21 are processes similar to the inverse processes executed in the image decoding apparatus described later. Consequently, these inverse processes will be described later with reference to FIG. 9 in the description related to the image decoding apparatus.

The addition section 23 adds the restored prediction error data input from the inverse processing section 21 to the predicted image data input from the intra-prediction section 30 or the inter-prediction section 40 to thereby generate decoded image data (reconstructed image). Then, the addition section 23 outputs the generated decoded image data to the deblocking filter 24 and the frame memory 26.

The deblocking filter 24 and the SAO filter 25 are both in-loop filters for improving image quality of reconstructed images. The deblocking filter 24 removes block distortions by filtering the decoded image data input from the addition section 23, and
 outputs the filtered decoded image data to the SAO filter 25. The SAO filter 25 removes noises by applying an edge offset process or a band offset process to the decoded image data input from the deblocking filter 24, and outputs the processed decoded image data to the frame memory 26.

The frame memory 26 stores the un-filtered decoded image data input from the addition section 23 and the decoded image data to which in-loop filtering has been applied input from the SAO filter 25 in a storage medium.

The switch 27 reads the un-filtered decoded image data to be used for the intra-prediction out from the frame memory 26 and supplies the read decoded image data as reference image data to the intra-prediction section 30. Further, the switch 27 reads the filtered decoded image data to be used for the inter-prediction out from the frame memory 26 and supplies the read decoded image data as reference image data to the inter-prediction section 40.

The mode setting section 28 sets a prediction coding mode for each block on the basis of comparison between costs input from the intra-prediction section 30 and the inter-prediction section 40. The mode setting section 28 outputs, for a block for which the intra-prediction mode is set, predicted image data generated by the intra-prediction section 30 to the subtraction section 13 and information regarding intra-prediction to the lossless encoding section 16. Further, the mode setting section 28 outputs, for a block for which an inter-prediction mode is set, predicted image data generated by the inter-prediction section 40 to the subtraction section 13 and outputs information regarding inter-prediction to the lossless encoding section 16.

The intra-prediction section 30 performs an intra-prediction process for each of PUs in HEVC on the basis of original image data and decoded image data. For example, the intra-prediction section 30 evaluates a cost based on a prediction error and an amount of code to be generated for each of prediction mode candidates within a search range. Then, the intra-prediction section 30 selects a prediction mode which minimizes the cost as an optimum prediction mode. In addition, the intra-prediction section 30 generates a predicted image data in accordance with the selected optimum prediction mode. Then, the intra-prediction section 30 outputs information regarding intra-prediction including prediction mode information indicating the optimum prediction mode, a corresponding cost, and the predicted image data to the mode setting section 28.

The inter-prediction section 40 executes an inter-prediction process (motion compensation) for each PU of HEVC, on the basis of original image data and decoded image data. The inter-prediction process (motion detection and motion compensation) is executed. For example, the inter-prediction section 40 evaluates a cost based on a prediction error and a generate code rate for each prediction mode candidate included in a search range specified by HEVC. Next, the inter-prediction section 40 selects the prediction mode yielding the minimum cost, or in other words the prediction mode yielding the highest compression ratio, as an optimal prediction mode. In addition, the inter-prediction section 40 generates predicted image data in accordance with the selected optimal prediction mode. Subsequently, the inter-prediction section 40 outputs information related to inter-prediction, the corresponding cost, and the predicted image data to the mode setting section 28.

(2) Processing Section

Figure 5:
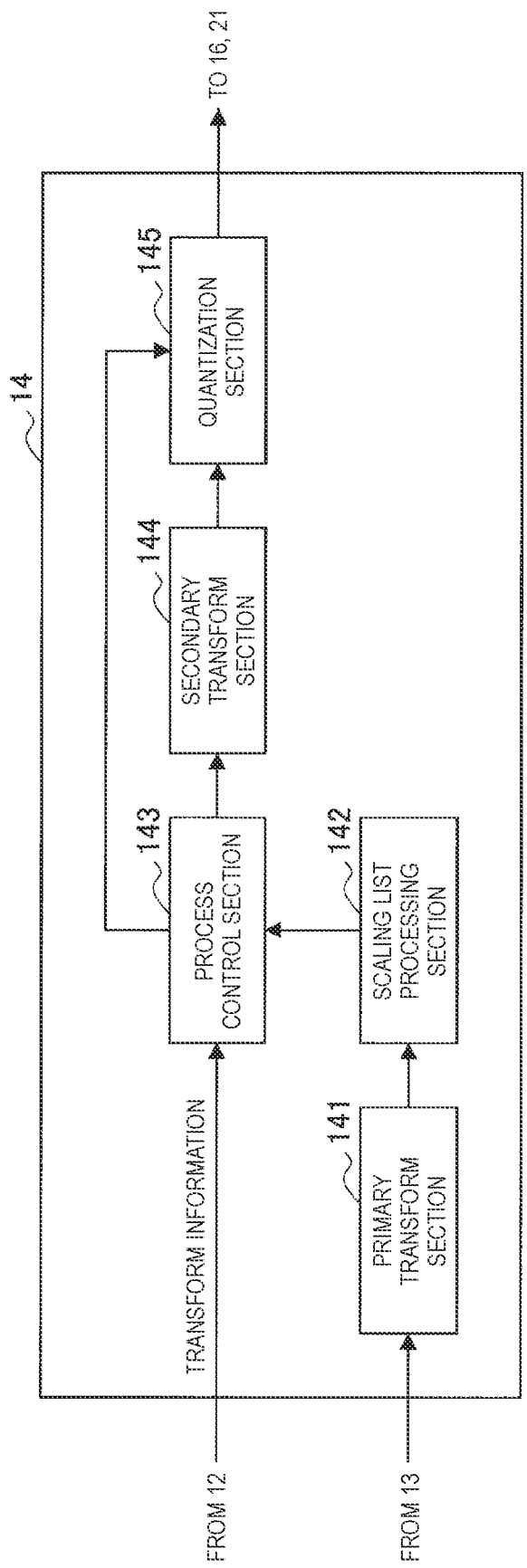
FIG. 5 is a block diagram illustrating an example of a detailed configuration of a processing section 14 according to the embodiment.

FIG. 5 is a block diagram illustrating one example of a detailed configuration of the processing section 14 illustrated in FIG. 4. Referring to FIG. 5, the processing section 14 includes a primary transform section 141, a scaling list processing section 142, a process control section 143, a secondary transform section 144, and a quantization section 145.

The primary transform section 141 executes a primary transform process on the prediction error data input from the subtraction section 13. The primary transform by the primary transform section 141 preferably is a direct transform process such as the discrete cosine transform or the discrete sine transform, for example. More specifically, the primary transform section 141 transforms the prediction error data input from the subtraction section 13 from an image signal in the spatial domain to transform coefficient data in the frequency domain for each TU. Subsequently, the primary transform section 141 outputs the transform coefficient data to the scaling list processing section 142.

The scaling list processing section 142 executes a scaling list process on the transform coefficient data input from the primary transform section 141. For example, the scaling list processing section 142 may execute the scaling list process by dividing the transform coefficient data by the scaling list included in the scaling list information decided by the control section 12. The scaling list processing section 142 outputs the coefficient data after the scaling list process (hereinafter called the scaling list coefficient data) to the process control section 143.

The process control section 143 controls the transform process by the secondary transform section 144 and the quantization process by the quantization section 145 described later, on the basis of the transform information related to the transform of a processing target block input from the control section 12. For example, the process control section 143 according to the present embodiment may determine whether or not to execute a secondary transform on the processing target block, on the basis of the transform information.

Note that for the process control section 143 to make the above determination, information (for example, a flag) indicating whether or not to execute the secondary transform on the processing target block may be included in the transform information, or information indicating the number and type of transforms with respect to the processing target block may be included, for example.

In the case of determining to execute the secondary transform on the processing target block, the process control section 143 outputs the scaling list coefficient data input from the scaling list processing section 142 to the secondary transform section 144. In such a case, the transform coefficient data after the transform process by the secondary transform section 144 is input into the quantization section 145 as described later.

Also, in the case of determining not to execute the secondary transform on the processing target block, the process control section 143 outputs the scaling list coefficient data input from the scaling list processing section 142 to the quantization section 145. In such a case, since the input of data into the secondary transform section 144 is skipped and the transform process by the secondary transform section 144 is not executed, the scaling list coefficient data is input into the quantization section 145.

In other words, the process control section 143 may control the input into the transform process by the secondary transform section 144 and the quantization process by the quantization section 145 on the basis of the transform information.

In the case in which scaling list coefficient data is input from the process control section 143, the secondary transform section 144 executes a transform process (secondary transform process) according to another transform (secondary transform) different from the primary transform. The secondary transform process according to the present embodiment is not particularly limited, but may be a transform process that transforms to a domain other than the frequency domain, like the secondary transform process described in Non-Patent Literature 1, for example. Also, the secondary transform process executed by the secondary transform section 144 may be specified from among multiple transform processes prepared in advance, on the basis of the transform information decided by the control section 12. The secondary transform section 144 outputs transform coefficient data after the secondary transform process to the quantization section 145.

The quantization section 145 executes a quantization process based on the quantization parameter qP decided by the control section 12. The quantization section 145, under control by the process control section 143, executes the quantization process by treating the transform coefficient data after the transform process by the secondary transform section 144 or the scaling list coefficient data as the input data. The quantization section 145 outputs the quantized data after the quantization process to the lossless encoding section 16 and the inverse processing section 21.

According to the configuration of the processing section 14 described above, the scaling list process may be executed immediately after the process of transforming to the frequency domain by the primary transform section 141. Consequently, bandwidth control through the scaling list process becomes possible, regardless of the number and type of transforms to be applied to the processing target block.

1-3. Flow of Process when Encoding

(1) Existing Technique

Figure 6:
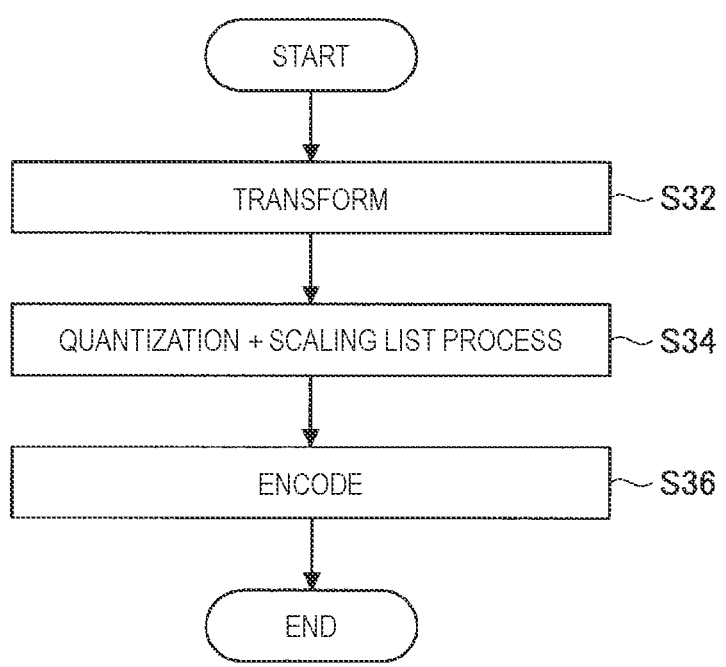
FIG. 6 is a flowchart illustrating one example of a flow of a process when encoding in accordance with an existing technique in the case in which the number of transforms is 1.

FIG. 6 is a flowchart illustrating one example of a flow of a process when encoding in accordance with an existing technique in the case in which the number of transforms is 1.

Referring to FIG. 6, first, a transform process is executed (S32), and then quantization and a scaling list process are executed (S34). Next, an encoding process is executed (S36).

(2) New Technique

Figure 7:
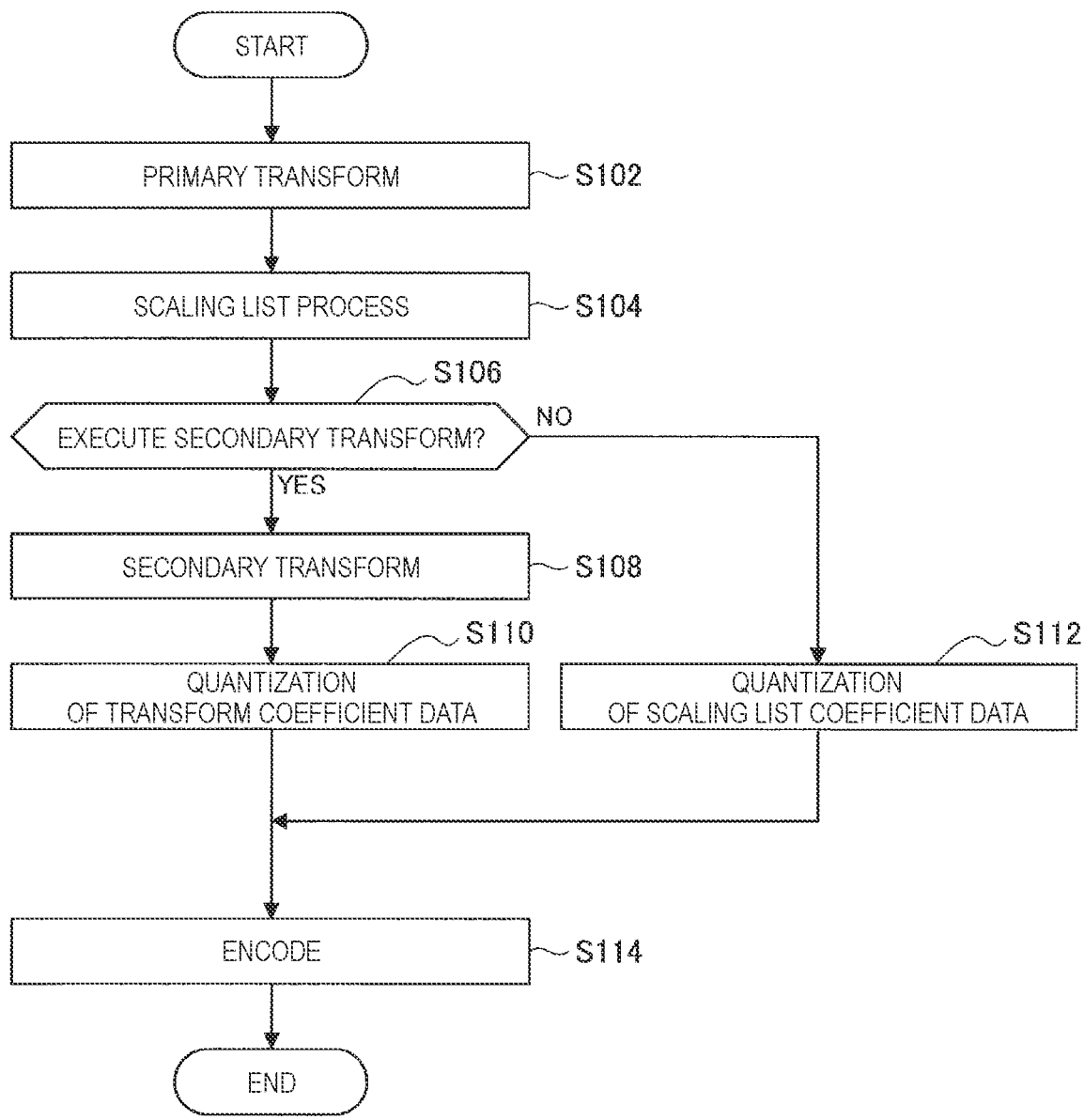
FIG. 7 is a flowchart illustrating an example of a flow of a process when encoding in accordance with a new technique according to the embodiment.

FIG. 7 is a flowchart illustrating an example of a flow of a process when encoding in accordance with a new technique according to the present embodiment described above.

Referring to FIG. 7, the primary transform section 141 executes a primary transform process on the prediction error data input from the subtraction section 13 (S102). Next, the scaling list processing section 142 executes a scaling list process on the transform coefficient data input from the primary transform section 141 (S104). Next, the process control section 143 determines whether or not to execute a secondary transform on the basis of the transform information (S106).

In the case of determining to execute the secondary transform (YES in S106), the scaling list coefficient data is output to the secondary transform section 144, and the secondary transform section 144 executes the secondary transform (S108). Next, the quantization section 145 executes a quantization process on the transform coefficient data after the transform process by the secondary transform section 144 (S110).

On the other hand, in the case of determining not to execute the secondary transform (NO in S106), the scaling list coefficient data is output to the quantization section 145, and the quantization section 145 executes the quantization process on the scaling list coefficient data (S112).

Finally, the lossless encoding section 16 encodes the quantized data obtained by the process of step S110 or step S112. Also, at this time, the lossless encoding section 16 encodes various encoding parameters including transform information and the like.

Note that the units of processing for each process described above may be any units, and do not have to be the same as each other. Consequently, the process in each step can also be executed in parallel with the process of another step or the like, or alternatively, the processing order in which to execute the processes may be rearranged.

By executing each process as above, the image encoding apparatus 10 is able to execute the scaling list process immediately after the process of transforming to the frequency domain, regardless of the number and type of transforms to be applied to the processing target block. Consequently, bandwidth control through the scaling list process becomes possible, regardless of the number and type of transforms to be applied to the processing target block.

1-4. Configuration of Image Decoding Apparatus

(1) Overall Configuration

Figure 8:
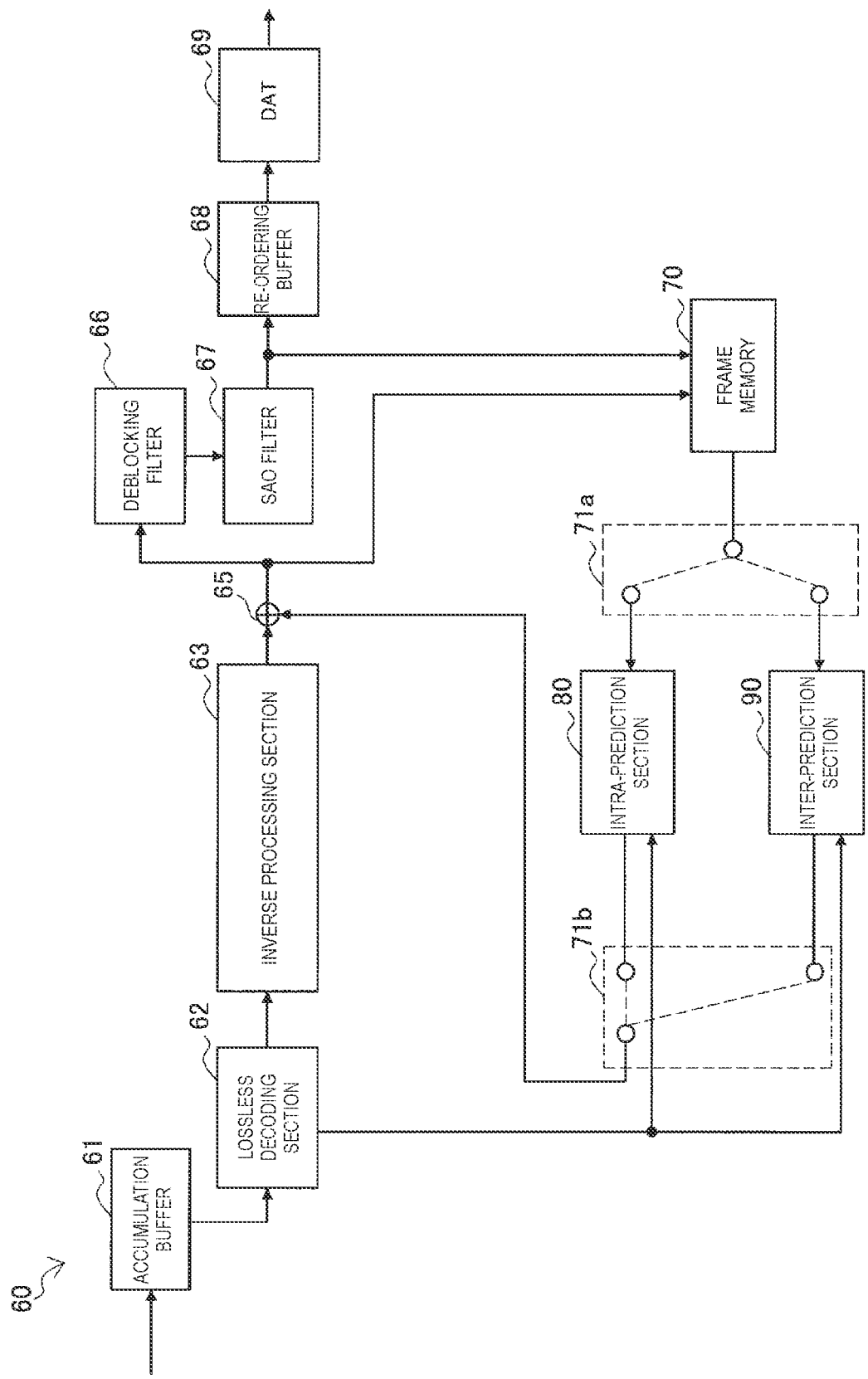
FIG. 8 is a block diagram illustrating one example of a configuration of an image decoding apparatus 60 according to the embodiment.

Next, the decoding of encoded data encoded as above will be described. FIG. 8 is a block diagram illustrating one example of the configuration of an image decoding apparatus 60, which is one aspect of an image processing apparatus according to the present embodiment. Referring to FIG. 8, an accumulation buffer 61, a lossless decoding section 62, an inverse processing section 63, an addition section 65, a deblocking filter 66, an SAO filter 67, a re-ordering buffer 68, a digital to analog (D/A) conversion section 69, frame memory 70, selectors 71a and 71b, an intra-prediction section 80, and an inter-prediction section 90 are provided.

The accumulation buffer 61 uses a storage medium to temporarily buffer an encoded stream received from the image encoding apparatus 10 via a transmission section not illustrated (such as a communication interface or a connection interface that connects with peripheral equipment, for example).

The lossless decoding section 62 decodes quantized data from the encoded stream input from the accumulation buffer 61, in accordance with the encoding scheme used during encoding. Also, the lossless decoding section 62 decodes the encoding parameters inserted into the header area of the encoded stream. The encoding parameters decoded by the lossless decoding section 62 may include the above-described transform information, scaling list information, quantization parameter, information related to intra-prediction, information related to inter-prediction, and the like, for example.

The lossless decoding section 62 outputs the quantized data, the transform information, the scaling list information, and the quantization parameter to the inverse processing section 63. Also, the lossless decoding section 62 outputs information related to intra-prediction to the intra-prediction section 80. Also, the lossless decoding section 62 outputs information related to inter-prediction to the inter-prediction section 90.

The inverse processing section 63 executes an inverse process of the process performed by the processing section 14 (FIGS. 4, 5) during encoding on the quantized data input from the lossless decoding section 62, and generates prediction error data. The inverse processing section 63 outputs the generated prediction error data to the addition section 65. Note that a more detailed configuration of the inverse processing section 63 will be further described later.

The addition section 65 generates decoded image data by adding the prediction error data input from the inverse processing section 63 to predicted image data input from the selector 71b. Then, the addition section 65 outputs the generated decoded image data to the deblocking filter 66 and the frame memory 70.

The deblocking filter 66 removes a block distortion by filtering the decoded image data input from the addition section 65 and outputs the filtered decoded image data to the SAO filter 67.

The SAO filter 67 removes noises by applying an edge offset process or a band offset process to the decoded image data input from the deblocking filter 66 and outputs the processed decoded image data to the re-ordering buffer 68 and the frame memory 70.

The re-ordering buffer 68 re-orders images input from the SAO filter 67, thereby generating a sequence of time-series image data. Then, the re-ordering buffer 68 outputs the generated image data to the D/A conversion section 69.

The D/A conversion section 69 converts image data in a digital format input from the re-ordering buffer 68 into an image signal in an analog format. Subsequently, for example, the D/A conversion section 69 outputs the analog image signal to a display (not illustrated) connected to the image decoding apparatus 60, and thereby causes decoded video to be displayed.

The frame memory 70 stores the unfiltered decoded image data input from the addition section 65 and the filtered decoded image data input from the SAO filter 67 in a storage medium.

The selector 71a switches an output destination of the image data from the frame memory 70 between the intra-prediction section 80 and the inter-prediction section 90 for each block in the image in accordance with mode information acquired by the lossless decoding section 62. In the case where an intra-prediction mode has been designated, for example, the selector 71a outputs the decoded image data that has not been filtered supplied from the frame memory 70 to the intra-prediction section 80 as reference image data. In addition, in the case where an inter-prediction mode has been designated, the selector 71a outputs the filtered decoded image data to the inter-prediction section 90 as reference image data.

The selector 71b switches an output source of the predicted image data to be supplied to the addition section 65 between the intra-prediction section 80 and the inter-prediction section 90 in accordance with mode information acquired by the lossless decoding section 62. In the case where the intra-prediction mode has been designated, for example, the selector 71b supplies the predicted image data output from the intra-prediction section 80 to the addition section 65. In addition, in the case where the inter-prediction mode has been designated, the selector 71b supplies the predicted image data output from the inter-prediction section 90 to the addition section 65.

The intra-prediction section 80 performs an intra-prediction process on the basis of information regarding intra-prediction and the reference image data from the frame memory 70, thereby generating the predicted image data. Then, the intra-prediction section 80 outputs the generated predicted image data to the selector 71b.

The inter-prediction section 90 performs an inter-prediction process on the basis of information regarding inter-prediction input from the lossless decoding section 62 and the reference image data from the frame memory 70, thereby generating the predicted image data. Then, the inter-prediction section 90 outputs the generated predicted image data to the selector 71b.

(2) Inverse Processing Section

Figure 9:
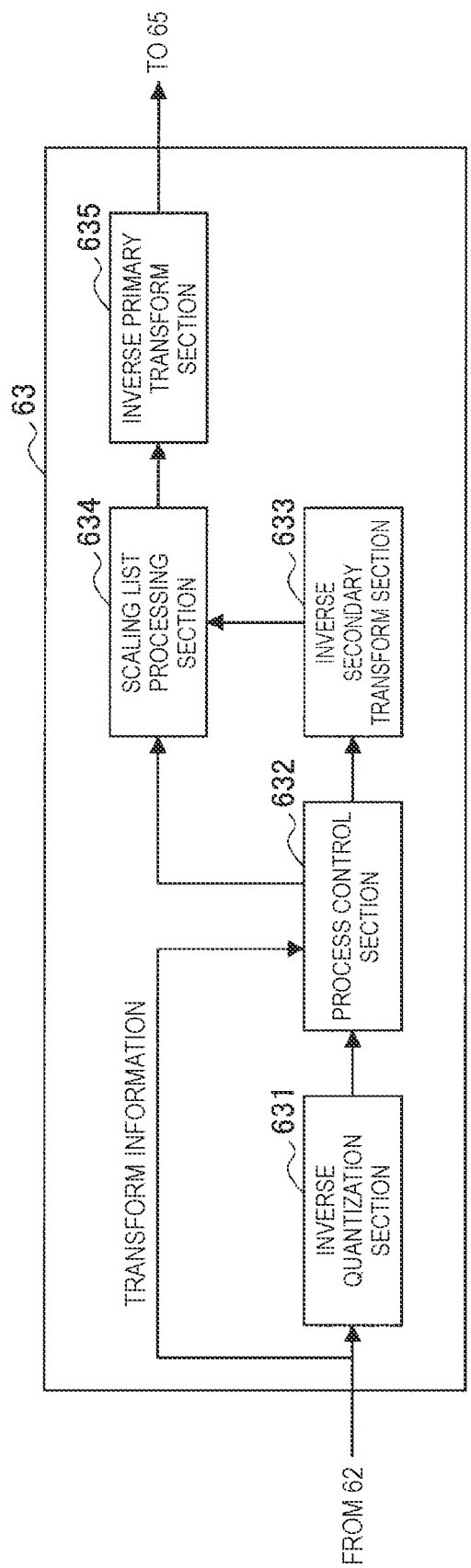
FIG. 9 is a block diagram illustrating one example of a detailed configuration of an inverse processing section 63 according to the embodiment.

FIG. 9 is a block diagram illustrating one example of a detailed configuration of the inverse processing section 63 illustrated in FIG. 8. Referring to FIG. 9, the inverse processing section 63 includes an inverse quantization section 631, a process control section 632, an inverse secondary transform section 633, a scaling list processing section 634, and an inverse primary transform section 635.

The inverse quantization section 631 inversely quantizes the quantized data input from the lossless decoding section 62 with the same quantization parameter qP as the one used during encoding, and reconstructs coefficient data. For example, the inverse quantization section 631 may execute the inverse quantization process as described with reference to Formula (6). The inverse quantization section 631 outputs the reconstructed coefficient data to the process control section 632. Note that the coefficient data reconstructed by the inverse quantization section 631 may be either transform coefficient data according to a secondary transform process or scaling list coefficient data, depending on whether or not a secondary transform was performed during encoding.

On the basis of the transform information related to the transform of the processing target block, the process control section 632 controls an inverse transform process by the inverse secondary transform section 633 and a scaling list process by the scaling list processing section 634 described later. For example, the process control section 632 according to the present embodiment may determine whether or not to execute an inverse secondary transform on the processing target block, on the basis of the transform information.

Note that for the process control section 632 to make the above determination, information (for example, a flag) indicating whether or not a secondary transform was performed on the processing target block during encoding may be included in the transform information, or information indicating the number and type of transforms with respect to the processing target block may be included, for example. For example, the process control section 632 may determine to perform an inverse secondary transform if a secondary transform has been performed during encoding, and may determine not to perform an inverse secondary transform if a secondary transform has not been performed during encoding.

In the case of determining to execute the inverse secondary transform on the processing target block, the process control section 632 outputs the coefficient data input from the inverse quantization section 631 to the inverse secondary transform section 633. In such a case, coefficient data after the inverse secondary transform process by the inverse secondary transform section 633 is input into the scaling list processing section 634 as described later.

In the case of determining not to execute the inverse secondary transform on the processing target block, the process control section 632 outputs the coefficient data input from the inverse quantization section 631 to the scaling list processing section 634. In such a case, since the input of data into the inverse secondary transform section 633 is skipped and the inverse transform process by the inverse secondary transform section 633 is not executed, coefficient data after inverse quantization is input into the scaling list processing section 634.

In other words, the process control section 632 may control the input into the inverse transform process by the inverse secondary transform section 633 and the scaling list process by the scaling list processing section 634 according to the above determination based on the transform information.

In the case in which coefficient data is input from the process control section 632, the inverse secondary transform section 633 executes an inverse transform process (inverse secondary transform process) of the secondary transform that was performed during encoding. The inverse secondary transform section 633 outputs coefficient data after the secondary transform process to the scaling list processing section 634.

The scaling list processing section 634 executes a scaling list process on the basis of the scaling list information input from the lossless decoding section 62. The scaling list processing section 634, under control by the process control section 632, executes the scaling list process by treating the coefficient data after the transform process by the inverse secondary transform section 633 or the coefficient data after the inverse quantization process by the inverse quantization section 631 as the input data.

For example, the scaling list processing section 634 may execute the scaling list process as described with reference to Formula (7). The scaling list processing section 634 outputs transform coefficient data after the scaling list process to the inverse primary transform section 635.

The inverse primary transform section 635 generates prediction error data by performing an inverse primary transform on the transform coefficient data input from the scaling list processing section 634, in accordance with the transform scheme of the primary transform process used during encoding. The inverse primary transform section 635 outputs the generated prediction error data to the addition section 65.

According to the configuration of the inverse processing section 63 described above, decoding according to the bandwidth control by the scaling list process becomes possible, regardless of the number and type of transforms applied to the processing target block.

1-5. Flow of Process when Decoding (1) Existing Technique

Figure 10:
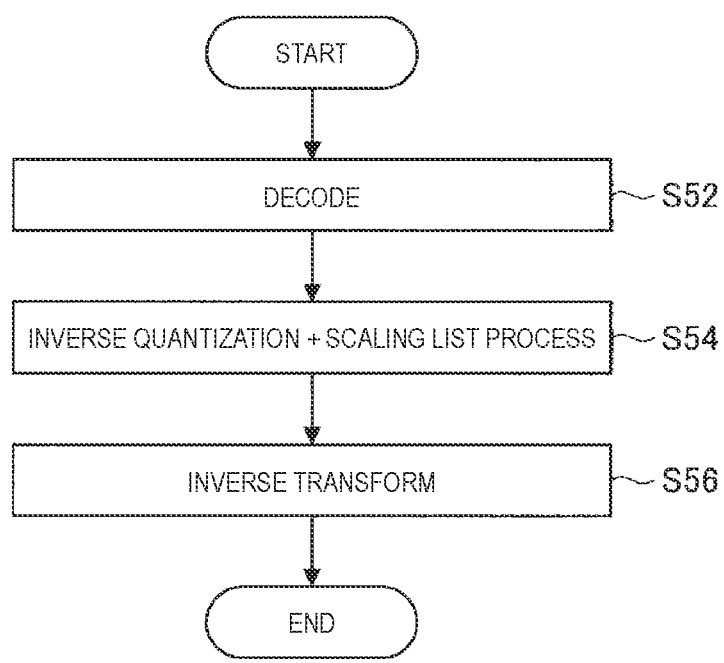
FIG. 10 is a flowchart illustrating one example of a flow of a process when decoding in accordance with an existing technique in the case in which the number of transforms is 1.

FIG. 10 is a flowchart illustrating one example of a flow of a process when decoding in accordance with an existing technique in the case in which the number of transforms is 1. Note that, from among the flow of the process when decoding, FIG. 10 illustrates the flow of the process focusing on the process from the decoding process to the process of generating prediction error data.

Referring to FIG. 10, first, the decoding process is performed (S52). Next, the inverse quantization and scaling list process is performed (S54), and after that, an inverse transform process is performed and prediction error data is generated (S56).

(2) New Technique

Figure 11:
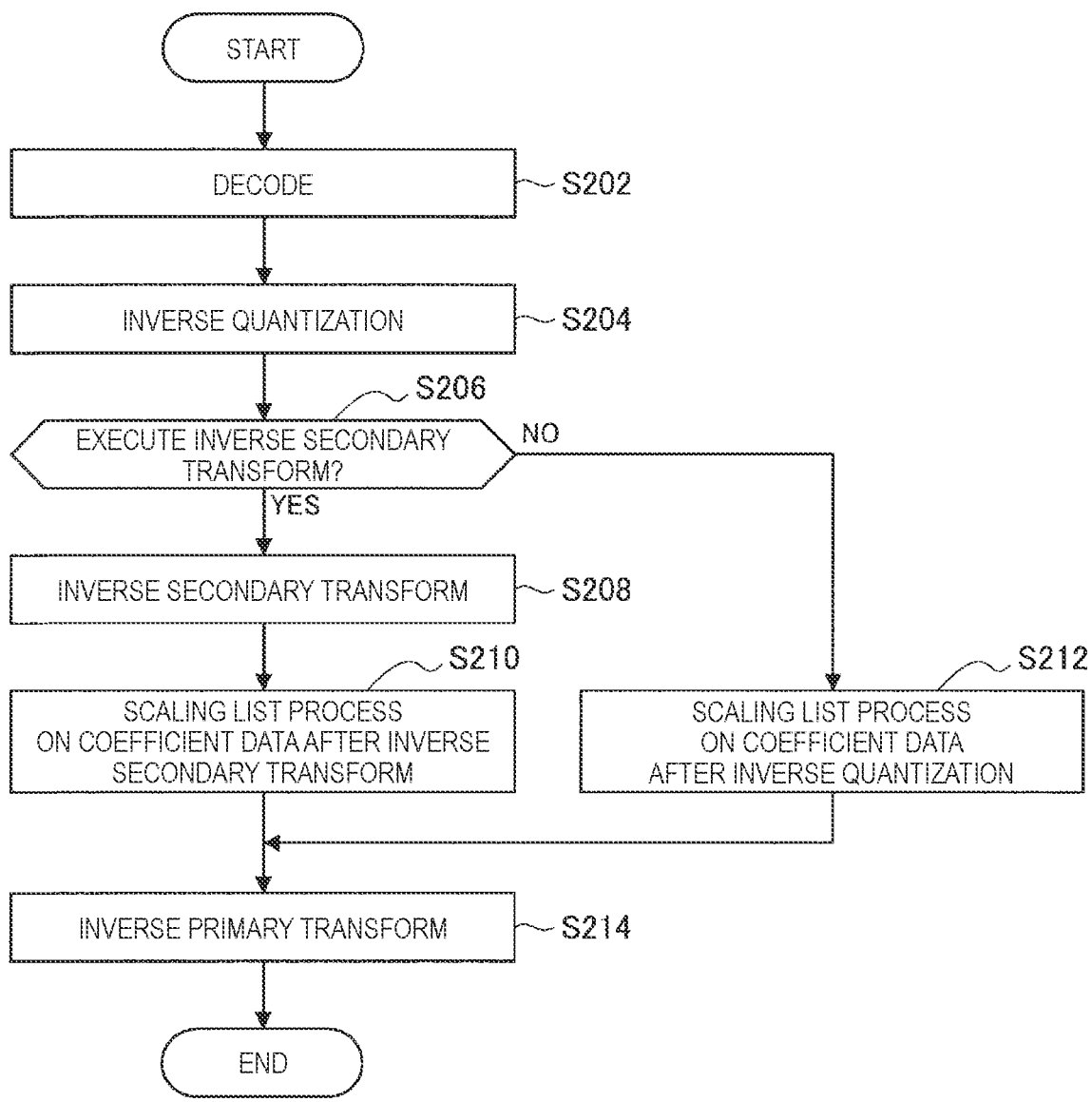
FIG. 11 is a flowchart illustrating an example of a flow of a process when decoding in accordance with a new technique according to the embodiment.

FIG. 11 is a flowchart illustrating an example of a flow of a process when decoding in accordance with a new technique according to the present embodiment described above. Note that, from among the flow of the process when decoding, FIG. 11 illustrates the flow of the process focusing on the process from the decoding process to the process of generating prediction error data.

Referring to FIG. 11, first, the lossless decoding section 62 performs the decoding process to acquire (decode) quantized data and encoding parameters (S202). At this point, transform information, scaling list information, the quantization parameter qP, and the like may be included in the acquired encoding parameters.

Next, the inverse quantization section 631 inversely quantizes the quantized data input from the lossless decoding section 62 with the same quantization parameter qP as the one used during encoding (S204). Next, the process control section 632 determines whether or not to execute an inverse secondary transform on the basis of the transform information (S206).

In the case of determining to execute the inverse secondary transform (YES in S206), coefficient data after the inverse quantization process is output to the inverse secondary transform section 633, and the inverse secondary transform section 633 executes the inverse secondary transform (S208). Next, the scaling list processing section 634 executes the scaling list process on the coefficient data after the transform process by the inverse secondary transform section 633 (S210).

On the other hand, in the case of determining not to execute the inverse secondary transform (NO in S206), coefficient data after the inverse quantization process is output to the scaling list processing section 634, and the scaling list processing section 634 executes the scaling list process on the coefficient data after the inverse quantization process (S212).

Subsequently, the inverse primary transform section 635 executes an inverse primary transform on the transform coefficient data obtained by the process of step S210 or step S212, and generates prediction error data (S214).

Note that the units of processing for each process described above may be any units, and do not have to be the same as each other. Consequently, the process in each step can also be executed in parallel with the process of another step or the like, or alternatively, the processing order in which to execute the processes may be rearranged.

By executing each process as above, the image decoding apparatus 60 is able to execute decoding according to bandwidth control through the scaling list process, regardless of the number and type of transforms applied to the processing target block.

2. Second Embodiment

2-1. Overview

The above describes the first embodiment of the present disclosure. Next, as a second embodiment of the present disclosure, the following will describe a case in which multiple transforms are expressed by a single transform through a convolution operation.

For example, provided that Fx is the convolution Fn* . . . F2*F1 of n transforms, the processes when encoding and when decoding according to the present embodiment are expressible as each of the following Formulas (8) and (9).

$$C = Q(SL_x(Fx(R))) \quad (8)$$

$$R = (F'x * SL_x'(DQ(C))) \quad (9)$$

Note that herein, $SL_x$ is expressed by the following Formula (10) using the scaling list $SL_{conv}$ decided by the control section 12 described in the first embodiment.

$$SL_x = Fx(SL_{conv}) \quad (10)$$

For example, in the case in which the number of transforms is 2, and the scaling list $SL_{conv}$ and the secondary transform F2 are expressed by the following Formulas (11) and (12), respectively, $SL_x$ is obtained by an inner product operation of the scaling list $SL_{conv}$ and the secondary transform F2 as in the following Formula (13), for example. Note that the specific coefficients of the secondary transform F2 are decided on the basis of the transform information from among multiple transforms, for example.

[Math. 4]

$$SL_{conv} = \begin{pmatrix} s_{0,0} & \cdots & s_{x,0} \\ \vdots & \ddots & \vdots \\ s_{0,y} & \cdots & s_{x,y} \end{pmatrix} \quad (11)$$

$$F2 = \begin{pmatrix} r_{0,0} & \cdots & r_{x,0} \\ \vdots & \ddots & \vdots \\ r_{0,y} & \cdots & r_{x,y} \end{pmatrix} \quad (12)$$

$$SL_x = SL_{conv} \cdot F2 = \begin{pmatrix} s_{0,0} \cdot r_{0,0} + s_{1,0} \cdot & & s_{0,0} \cdot r_{x,0} + s_{1,0} \cdot \\ r_{0,1} + \ldots + s_{x,0} \cdot r_{0,y} & \cdots & r_{x,1} + \ldots + s_{x,0} \cdot r_{x,y} \\ \vdots & \ddots & \vdots \\ s_{0,y} \cdot r_{0,0} + s_{1,y} \cdot & & s_{0,y} \cdot r_{x,0} + s_{1,y} \cdot \\ r_{0,1} + \ldots + s_{x,y} \cdot r_{0,y} & \cdots & r_{x,1} + \ldots + s_{x,y} \cdot r_{x,y} \end{pmatrix} \quad (13)$$

The above describes an overview of the present embodiment. Next, a configuration and a process flow according to the present embodiment will be described. Note that, for the sake of simplicity, the following describes an example in which the number of transforms to be applied is at most 2, but as described above, the number of transforms according to the present embodiment is not limited to such an example, and may also be 3 or more.

2-2. Configuration of Image Encoding Apparatus

Compared to the image encoding apparatus 10 according to the first embodiment, the image encoding apparatus 10 according to the present embodiment is different only in the functional configuration of the processing section and the inverse processing section. Accordingly, the following will describe the configuration of the processing section 14-2 provided in the image encoding apparatus 10 according to the present embodiment. Note that since the functional configuration of the inverse processing section provided in the image encoding apparatus 10 according to the present embodiment is similar to the inverse processing section provided in the image decoding apparatus 60 according to the present embodiment described later, a description is omitted here.

Figure 12:
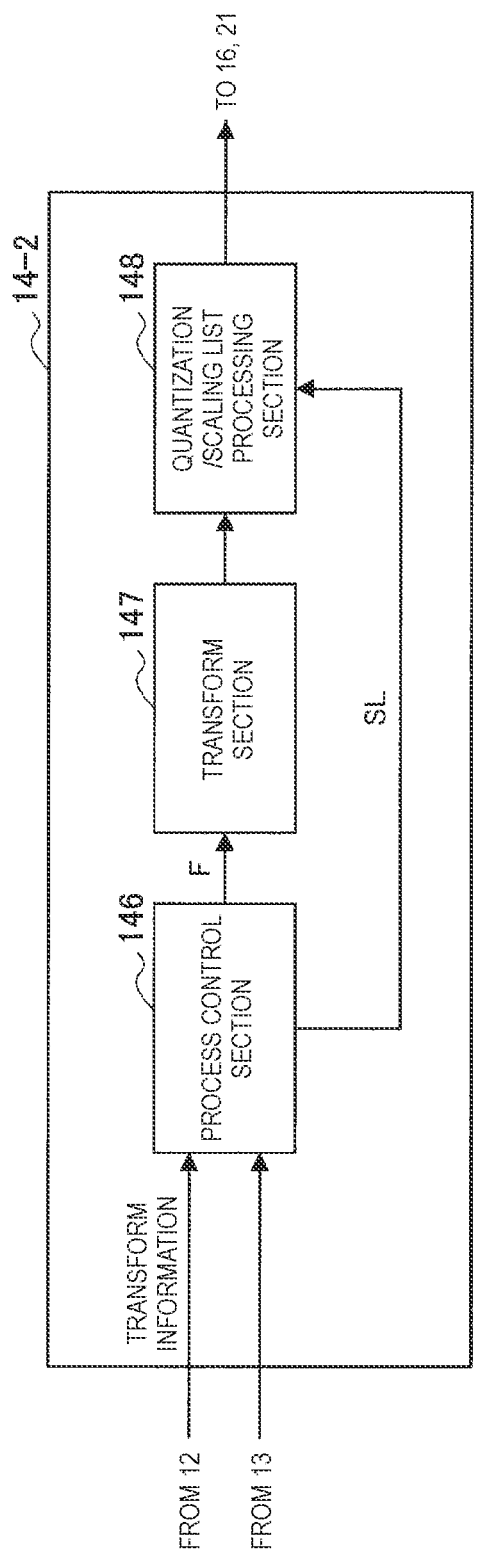
FIG. 12 is a block diagram illustrating an example of a detailed configuration of a processing section 14-2 according to a second embodiment of the present disclosure.

FIG. 12 is a block diagram illustrating one example of a detailed configuration of the processing section 14-2 provided in the image encoding apparatus 10 according to the present embodiment. Referring to FIG. 12, the processing section 14-2 includes a process control section 146, a transform section 147, and a quantization/scaling list processing section 148.

The process control section 146 controls the transform process by the transform section 147 and the quantization process and scaling list process by the quantization/scaling list processing section 148 described later, on the basis of the transform information related to the transform of a processing target block input from the control section 12.

For example, similarly to the process control section 143 described with reference to FIG. 5, the process control section 146 according to the present embodiment may determine whether or not to execute a secondary transform on the processing target block on the basis of the transform information.

Also, the process control section 146 according to the present embodiment specifies a transform F to be applied by the transform section 147 on the basis of the transform information. For example, in the case of executing a secondary transform, the transform F may be the transform Fx=F2*F1 obtained by a convolution operation of the primary transform F1 and the secondary transform F2. On the other hand, in the case of not executing the secondary transform, the transform F may be the primary transform F1. The process control section 146 provides information about the specified transform F to the transform section 147.

In addition, the process control section 146 according to the present embodiment specifies a scaling list SL to be used in the scaling list process performed by the quantization/scaling list processing section 148 on the basis of the transform information. For example, in the case of executing the secondary transform, the specified scaling list SL may be the scaling list $SL_x$ obtained as in Formula (13) using the scaling list $SL_{conv}$ decided by the control section 12 and the secondary transform F2. On the other hand, in the case of not executing the secondary transform, the specified scaling list SL may be the scaling list $SL_{conv}$ specified by the control section 12. The process control section 146 provides information about the specified scaling list SL to the quantization/scaling list processing section 148.

The transform section 147 executes a transform process on the prediction error data input from the subtraction section 13, on the basis of information about the transform F provided from the process control section 146. The transform section 147 outputs the transform coefficient data after the transform process to the quantization/scaling list processing section 148.

The quantization/scaling list processing section 148 executes a quantization process and a scaling list process on the basis of information about the scaling list SL provided from the process control section 146. Note that the quantization/scaling list processing section 148 may use the quantization parameter qP and the scaling list SL to execute the scaling list process and the quantization process simultaneously or consecutively. The quantization/scaling list processing section 148 outputs the quantized data after the quantization process to the lossless encoding section 16 and the inverse processing section 21.

According to the configuration of the processing section 14-2 described above, bandwidth control by the scaling list process becomes possible, regardless of the number and type of transforms applied to the processing target block. Also, since multiple transforms are expressed as a single transform through a convolution operation, the amount of processing may be reduced.

2-3. Flow of Process when Encoding

Figure 13:
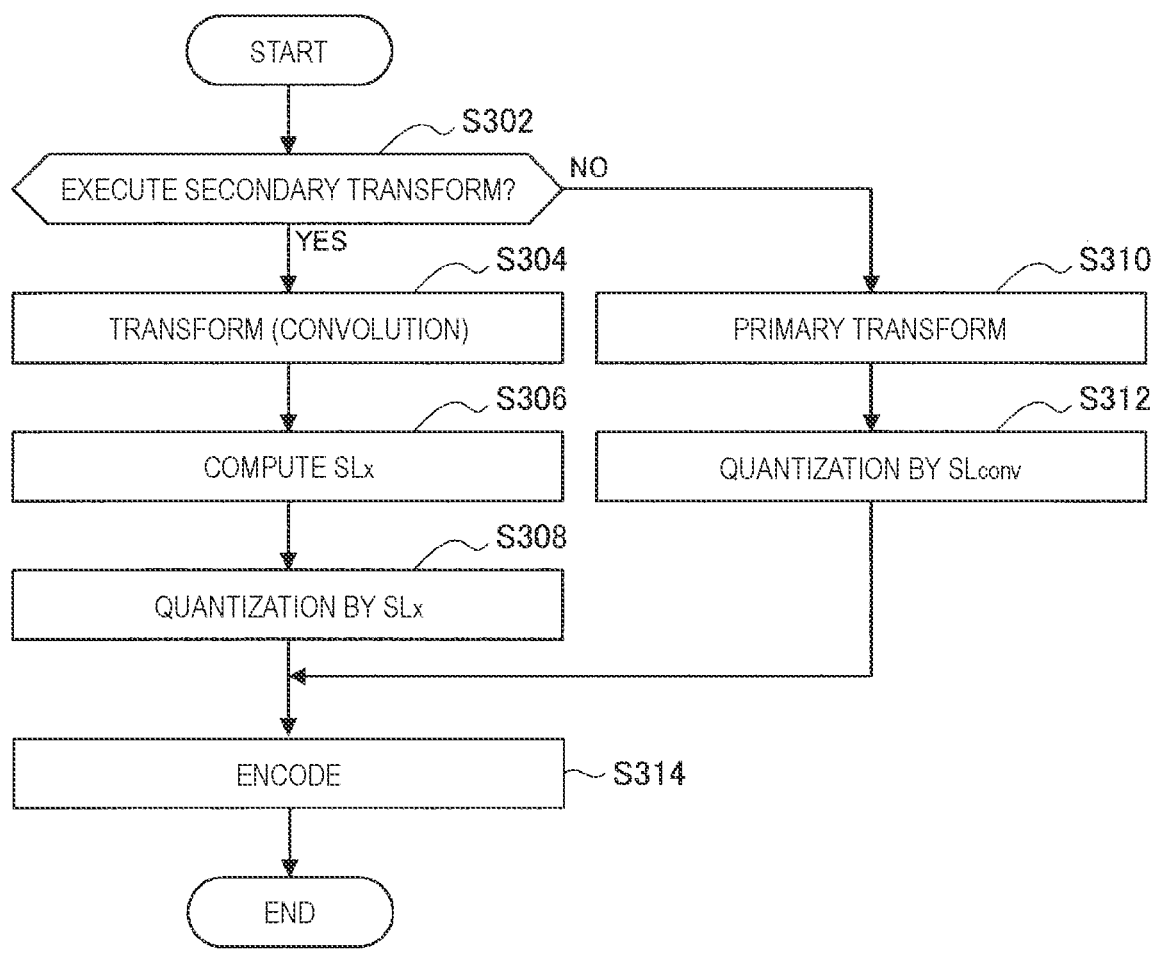
FIG. 13 is a flowchart illustrating one example of a flow of a process during encoding according to the embodiment.

FIG. 13 is a flowchart illustrating an example of a flow of a process when encoding according to the present embodiment described above.

Referring to FIG. 13, first, the process control section 146 determines whether or not to execute a secondary transform on the processing target block (S302). In the case of determining to execute the secondary transform (YES in S302), the transform section 147 executes the transform process through a convolution operation of the primary transform and the secondary transform (S304). Next, the scaling list $SL_x$ is computed by the process control section 146 (S306), and the quantization/scaling list processing section 148 uses the computed scaling list $SL_x$ to execute the quantization process and the scaling list process (S308).

On the other hand, in the case of determining not to execute the secondary transform (NO in S302), the transform section 147 executes the primary transform (S310), and the quantization/scaling list processing section 148 uses the scaling list $SL_{conv}$ decided by the control section 12 to execute the quantization process and the scaling list process (S312).

Finally, the lossless encoding section 16 encodes the quantized data obtained by the process of step S308 or step S312. Also, at this time, the lossless encoding section 16 encodes various encoding parameters including transform information and the like.

Note that the units of processing for each process described above may be any units, and do not have to be the same as each other. Consequently, the process in each step can also be executed in parallel with the process of another step or the like, or alternatively, the processing order in which to execute the processes may be rearranged.

By executing each process as above, the image encoding apparatus 10 becomes able to execute bandwidth control through the scaling list process, regardless of the number and type of transforms applied to the processing target block. Also, since multiple transforms are expressed as a single transform through a convolution operation, the amount of processing may be reduced.

2-4. Configuration of Image Decoding Apparatus

Next, the decoding of encoded data encoded as above will be described. Compared to the image decoding apparatus 60 according to the first embodiment, the image decoding apparatus 60 according to the present embodiment is different only in the functional configuration of the inverse processing section. Accordingly, the following will describe the configuration of the inverse processing section 63-2 provided in the image decoding apparatus 60 according to the present embodiment.

Figure 14:
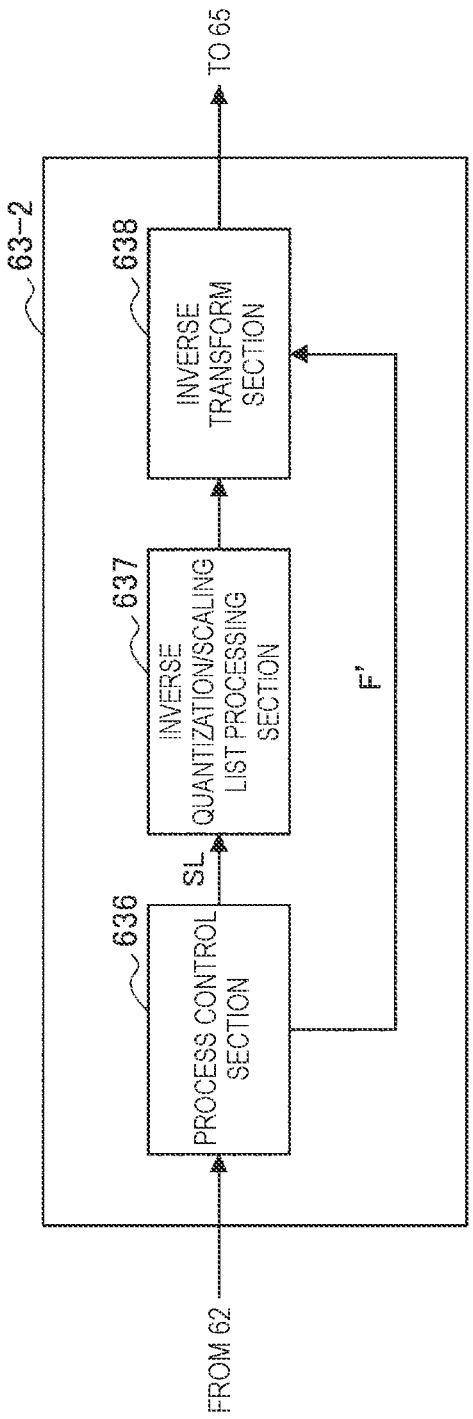
FIG. 14 is a block diagram illustrating one example of a detailed configuration of an inverse processing section 63-2 according to the embodiment.

FIG. 14 is a block diagram illustrating one example of a detailed configuration of the inverse processing section 63-2 provided in the image decoding apparatus 60 according to the present embodiment. Referring to FIG. 14, the inverse processing section 63-2 includes a process control section 636, an inverse quantization/scaling list processing section 637, and an inverse transform section 638.

On the basis of the transform information related to the transform of the processing target block, the process control section 636 controls a quantization process and scaling list process by the inverse quantization/scaling list processing section 637, and an inverse transform process by the inverse transform section 638.

For example, similarly to the process control section 632 described with reference to FIG. 9, the process control section 636 according to the present embodiment may determine whether or not to execute an inverse secondary transform on the processing target block on the basis of the transform information.

In addition, the process control section 636 according to the present embodiment specifies a scaling list SL to be used in the scaling list process performed by the inverse quantization/scaling list processing section 637 on the basis of the transform information. For example, in the case of executing the inverse secondary transform, the specified scaling list SL may be the scaling list $SL_x$ obtained by an inner product operation of the scaling list $SL_{conv}$ included in the scaling list information decoded by the lossless decoding section 62 and the secondary transform F2, as in Formula (13). On the other hand, in the case of not executing the inverse secondary transform, the specified scaling list SL may be the scaling list $SL_{conv}$ included in the scaling list information decoded by the lossless decoding section 62. The process control section 636 provides information about the specified scaling list SL to the inverse quantization/scaling list processing section 637.

Also, the process control section 636 according to the present embodiment specifies an inverse transform F' to be applied by the inverse transform section 638 on the basis of the transform information. For example, in the case of executing the inverse secondary transform, the transform F' may be the inverse transform F'x of the transform Fx=F2*F1 obtained by a convolution operation of the primary transform F1 and the secondary transform F2. On the other hand, in the case of not executing the inverse secondary transform, the inverse transform F may be the inverse transform of the primary transform F1, namely an inverse primary transform F'1. The process control section 146 provides information about the specified inverse transform F' to the inverse transform section 638.

The inverse quantization/scaling list processing section 637 executes an inverse quantization process and a scaling list process on the basis of information about the scaling list SL provided from the process control section 636. Note that the inverse quantization/scaling list processing section 637 may use the quantization parameter qP and the scaling list SL to execute the quantization process and the scaling list process simultaneously or consecutively. The inverse quantization/scaling list processing section 637 outputs transform coefficient data after the inverse quantization process to the inverse transform section 638.

The inverse transform section 638 generates prediction error data by executing an inverse transform process on the transform coefficient data input from the inverse quantization/scaling list processing section 637 on the basis of the information about the inverse transform F' provided from the process control section 636. The inverse transform section 638 outputs the generated prediction error data to the addition section 65.

According to the configuration of the inverse processing section 63-2 described above, decoding according to the bandwidth control by the scaling list process becomes possible, regardless of the number and type of transforms applied to the processing target block. Also, since multiple transforms are expressed as a single transform through a convolution operation, the amount of processing may be reduced.

2-5. Flow of Process when Decoding

Figure 15:
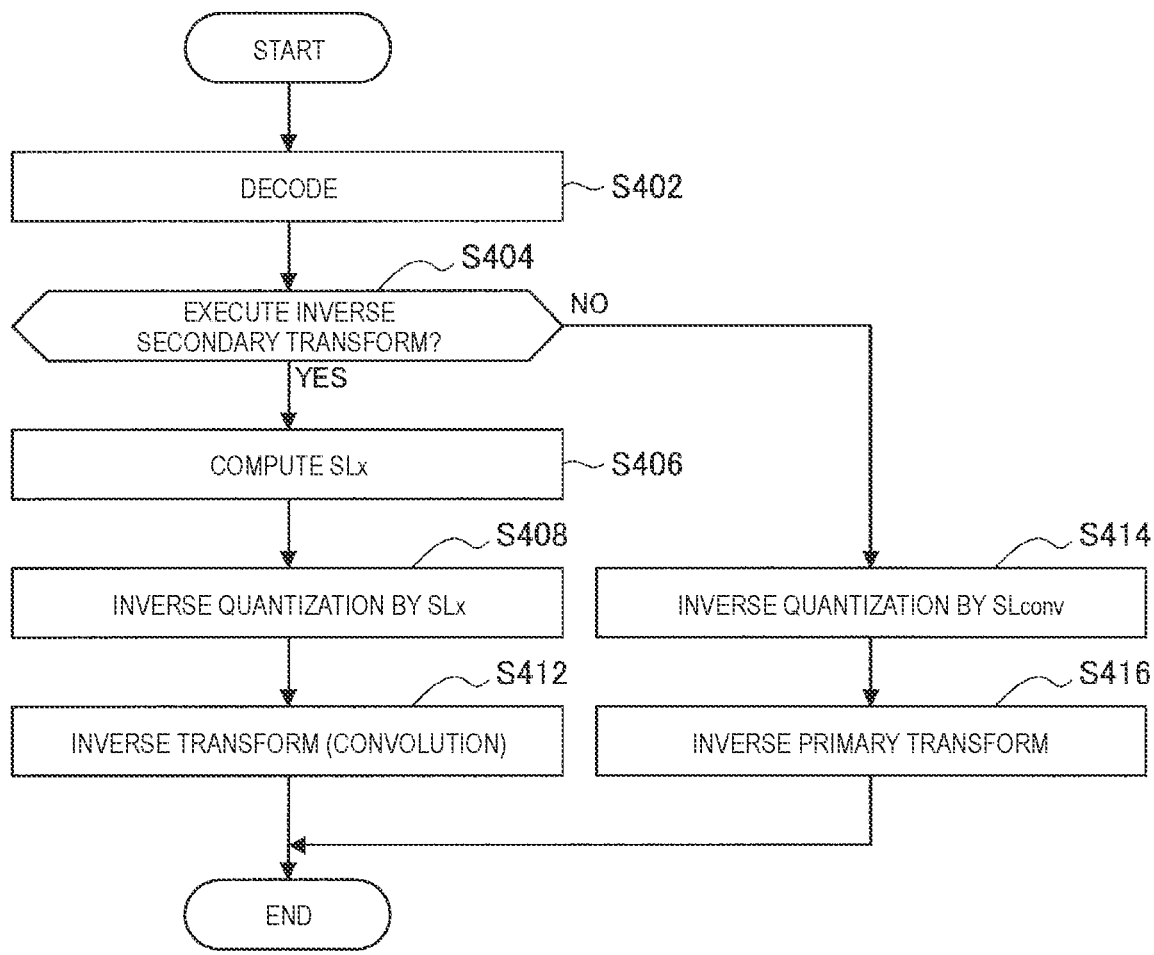
FIG. 15 is a flowchart illustrating one example of a flow of a process during decoding according to the embodiment.

FIG. 15 is a flowchart illustrating an example of a flow of a process when decoding according to the present embodiment described above. Note that, from among the flow of the process when decoding, FIG. 15 illustrates the flow of the process focusing on the process from the decoding process to the process of generating prediction error data.

Referring to FIG. 15, first, the lossless decoding section 62 performs the decoding process to acquire (decode) quantized data and encoding parameters (S402). At this point, transform information, scaling list information, the quantization parameter qP, and the like may be included in the acquired encoding parameters.

Next, the process control section 636 determines whether or not to execute an inverse secondary transform on the processing target block, on the basis of the transform information (S404).

In the case of determining to execute the inverse secondary transform (YES in S404), the scaling list $SL_x$ is computed by the process control section 636 (S406). Next, the inverse quantization/scaling list processing section 637 uses the computed scaling list $SL_x$ to execute the inverse quantization process and the scaling list process (S408). Next, the inverse transform section 638 executes the inverse transform process of the transform process by a convolution operation of the primary transform and the secondary transform to generate prediction error data (S412).

On the other hand, in the case of determining not to execute the inverse secondary transform (NO in S404), the inverse quantization/scaling list processing section 637 uses the scaling list $SL_{conv}$ included in the scaling list information decoded in step S402 to execute the inverse quantization process and the scaling list process (S414).

Next, the inverse transform section 638 executes the inverse primary transform process to generate prediction error data (S416).

Note that the units of processing for each process described above may be any units, and do not have to be the same as each other. Consequently, the process in each step can also be executed in parallel with the process of another step or the like, or alternatively, the processing order in which to execute the processes may be rearranged.

By executing each process as above, the image decoding apparatus 60 is able to execute decoding according to bandwidth control through the scaling list process, regardless of the number and type of transforms applied to the processing target block. Also, since multiple transforms are expressed as a single transform through a convolution operation, the amount of processing may be reduced.

3. Hardware Configuration Example

The series of processes described above can be executed by hardware, and can also be executed in software. In the case of executing the series of processes by software, a program forming the software is installed on a computer. Herein, the term computer includes a computer built into special-purpose hardware, a computer able to execute various functions by installing various programs thereon, such as a general-purpose personal computer, for example, and the like.

Figure 16:
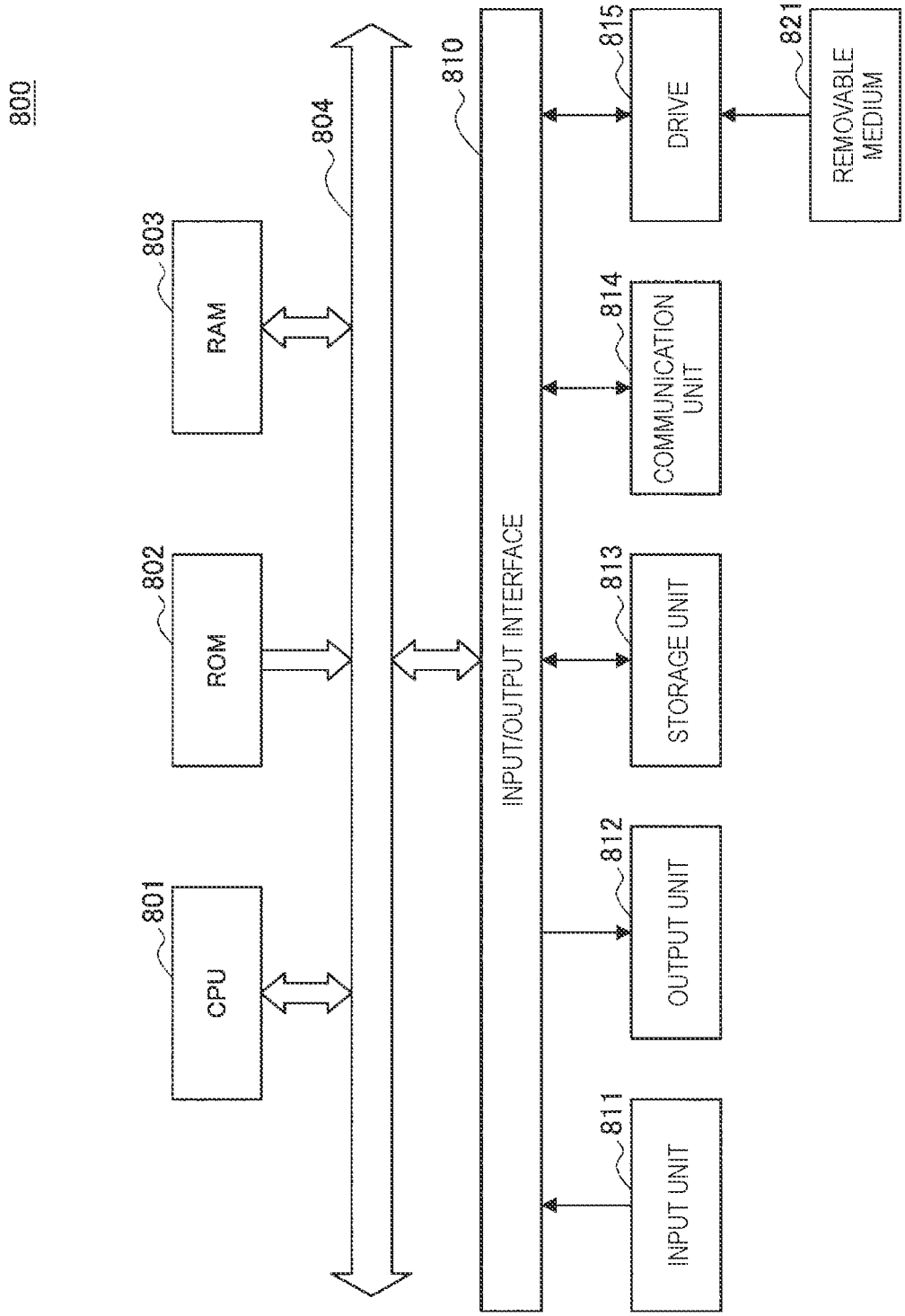
FIG. 16 is a block diagram illustrating a principal configuration example of a computer.

FIG. 16 is a block diagram illustrating an exemplary hardware configuration of a computer that executes the series of processes described above according to a program.

In the computer 800 illustrated in FIG. 16, a central processing unit (CPU) 801, read-only memory (ROM) 802, and random access memory (RAM) 803 are interconnected through a bus 804.

Additionally, an input/output interface 810 is also connected to the bus 804. An input unit 811, an output unit 812, a storage unit 813, a communication unit 814, and a drive 815 are connected to the input/output interface 810.

The input unit 811 includes a keyboard, a mouse, a microphone, a touch panel, an input terminal, and the like, for example. The output unit 812 includes a display, a speaker, an output terminal, and the like, for example. The storage unit 813 includes a hard disk, a RAM disk, non-volatile memory, and the like, for example. The communication unit 814 includes a network interface, for example.

The drive 815 drives a removable medium 821 such as a magnetic disk, an optical disc, a magneto-optical disc, or semiconductor memory.

In a computer configured as above, the series of processes described above are performed by having the CPU 801 load a program stored in the storage unit 813 into the RAM 803 via the input/output interface 810 and the bus 804, and execute the program, for example. Additionally, data required for the CPU 801 to execute various processes and the like is also stored in the RAM 803 as appropriate.

The program executed by the computer (CPU 801) may be applied by being recorded onto the removable medium 821 as an instance of packaged media or the like, for example. In this case, the program may be installed in the storage unit 813 via the input/output interface 810 by inserting the removable medium 821 into the drive 815.

In addition, the program may also be provided via a wired or wireless transmission medium such as a local area network, the Internet, or digital satellite broadcasting. In this case, the program may be received by the communication unit 814 and installed in the storage unit 813.

Otherwise, the program may also be preinstalled in the ROM 802 or the storage unit 813.

4. Application Examples

The image encoding apparatus 10 and the image decoding apparatus 60 according to the above-described embodiments can be applied to various electronic apparatuses such as: transmitters or receivers for satellite broadcasting, wired broadcasting such as cable TV, distribution on the Internet and distribution to terminals through cellular communication; recording devices which record images on media such as optical discs, magnetic disks, and flash memories; or reproduction devices which reproduce images from the foregoing storage media.

(1) First Application Example: Television Receiver

Figure 17:
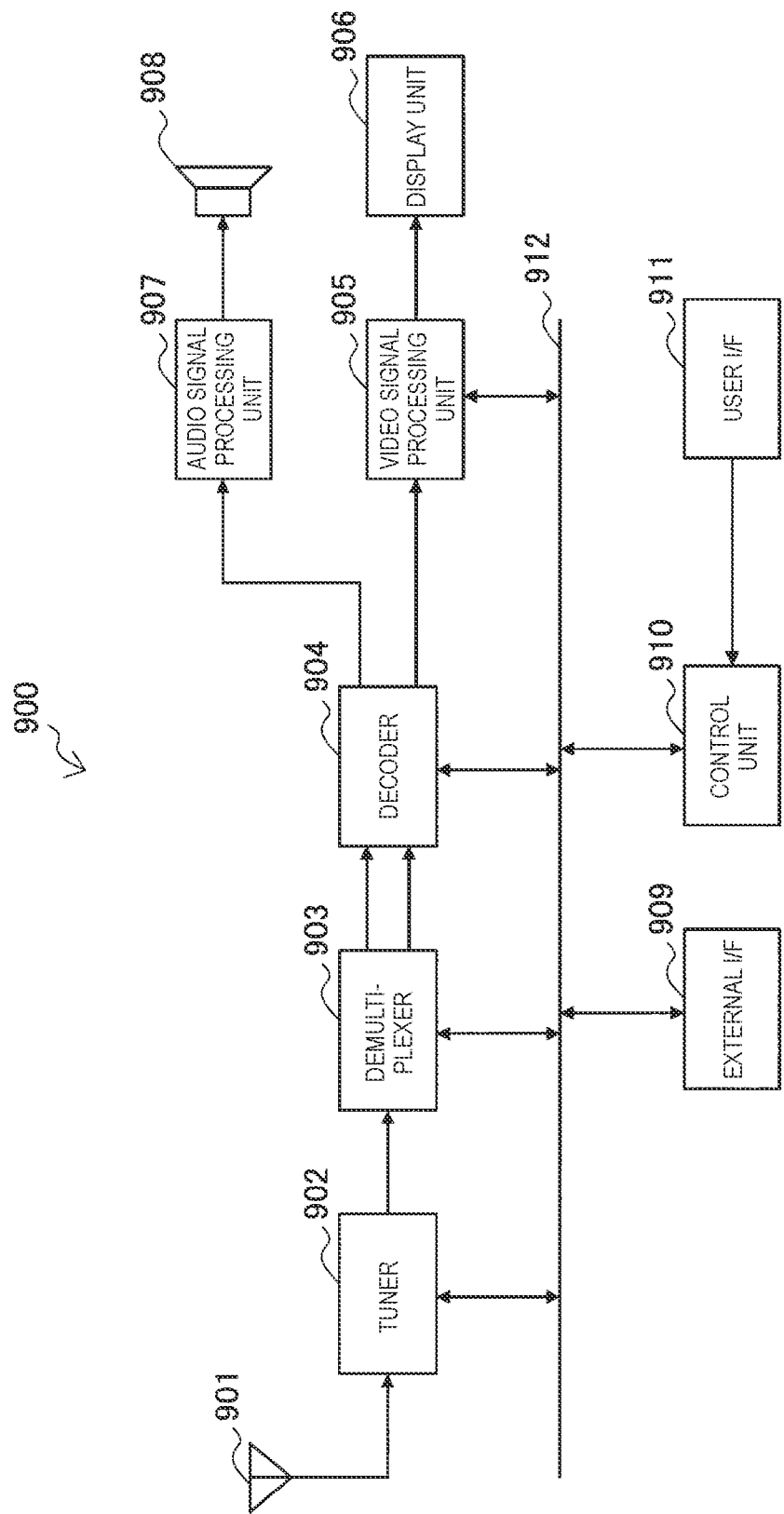
FIG. 17 is a block diagram illustrating an example of a schematic configuration of a television apparatus.

FIG. 17 illustrates an example of a schematic configuration of a television apparatus to which the above-described embodiment is applied. The television apparatus 900 has an antenna 901, a tuner 902, a demultiplexer 903, a decoder 904, a video signal processing unit 905, a display unit 906, an audio signal processing unit 907, a speaker 908, an external interface (I/F) 909, a control unit 910, a user interface (I/F) 911, and a bus 912.

The tuner 902 extracts a signal of a desired channel from a broadcasting signal received via the antenna 901 and demodulates the extracted signal. Then, the tuner 902 outputs an encoded bit stream obtained from the demodulation to the demultiplexer 903. That is, the tuner 902 plays a role as a transmission section of the television apparatus 900 which receives an encoded stream in which images are encoded.

The demultiplexer 903 demultiplexes a video stream and an audio stream of a program to be viewed from the encoded stream and outputs the demultiplexed streams to the decoder 904. In addition, the demultiplexer 903 extracts auxiliary data such as an electronic program guide (EPG) from the encoded bit stream and supplies the extracted data to the control unit 910. Note that, in the case where the encoded bit stream has been scrambled, the demultiplexer 903 may perform descrambling.

The decoder 904 decodes the video stream and the audio stream input from the demultiplexer 903. Then, the decoder 904 outputs video data generated from the decoding process to the video signal processing unit 905. In addition, the decoder 904 outputs audio data generated from the decoding process to the audio signal processing unit 907.

The video signal processing unit 905 reproduces the video data input from the decoder 904 to cause the display unit 906 to display a video. In addition, the video signal processing unit 905 may cause the display unit 906 to display an application screen supplied via a network. Furthermore, the video signal processing unit 905 may perform an additional process, for example, noise reduction, on the video data in accordance with a setting. Moreover, the video signal processing unit 905 may generate an image of a graphical user interface (GUI), for example, a menu, a button, or a cursor and superimpose the generated image on an output image.

The display unit 906 is driven with a driving signal supplied from the video signal processing unit 905 and displays a video or an image on a video plane of a display device (e.g., a liquid crystal display, a plasma display, an organic electroluminescence display (OLED), etc.).

The audio signal processing unit 907 performs a reproduction process including D/A conversion and amplification on the audio data input from the decoder 904 and causes the speaker 908 to output a sound. In addition, the audio signal processing unit 907 may perform an additional process such as noise removal on the audio data.

The external interface 909 is an interface for connecting the television apparatus 900 to an external apparatus or a network. For example, a video stream or an audio stream received via the external interface 909 may be decoded by the decoder 904. In other words, the external interface 909 also plays the role as a transmission sections of the television apparatus 900 which receives an encoded stream in which images are encoded.

The control unit 910 has a processor such as a CPU and a memory such as a RAM and a ROM. The memory stores a program executed by the CPU, program data, EPG data, and data acquired via a network. The program stored in the memory is read and executed by the CPU at the time of, for example, start-up of the television apparatus 900. The CPU controls operations of the television apparatus 900 by executing the program in response to, for example, operation signals input from the user interface section 911.

The user interface section 911 is connected to the control unit 910. The user interface section 911 includes, for example, buttons and switches with which a user operates the television apparatus 900, a reception unit for remote control signals, and the like. The user interface section 911 generates an operation signal by detecting an operation by a user via any aforementioned constituent element and outputs the generated operation signal to the control unit 910.

The bus 912 connects the tuner 902, the demultiplexer 903, the decoder 904, the video signal processing unit 905, the audio signal processing unit 907, the external interface 909, and the control unit 910 to one another.

In the television apparatus 900 configured in this way, the decoder 904 may also include the functions of the image decoding apparatus 60 described above. In other words, the decoder 904 may be configured to decode encoded data according to the method described in each of the above embodiments. With this arrangement, the television apparatus 900 becomes able to execute decoding according to bandwidth control through the scaling list process.

Also, in the television apparatus 900 configured in this way, the video signal processing unit 905 may be able to encode image data provided from the decoder 904, and cause the obtained encoded data to be output externally to the television apparatus 900 through external interface 909.

Additionally, the video signal processing unit 905 may also include the functions of the image encoding apparatus 10 described above. In other words, the video signal processing unit 905 may be configured to encode image data provided from the decoder 904 according to the method described in each of the above embodiments. With this arrangement, the television apparatus 900 becomes able to execute bandwidth control through the scaling list process.

(2) Second Application Example: Mobile Telephone

Figure 18:
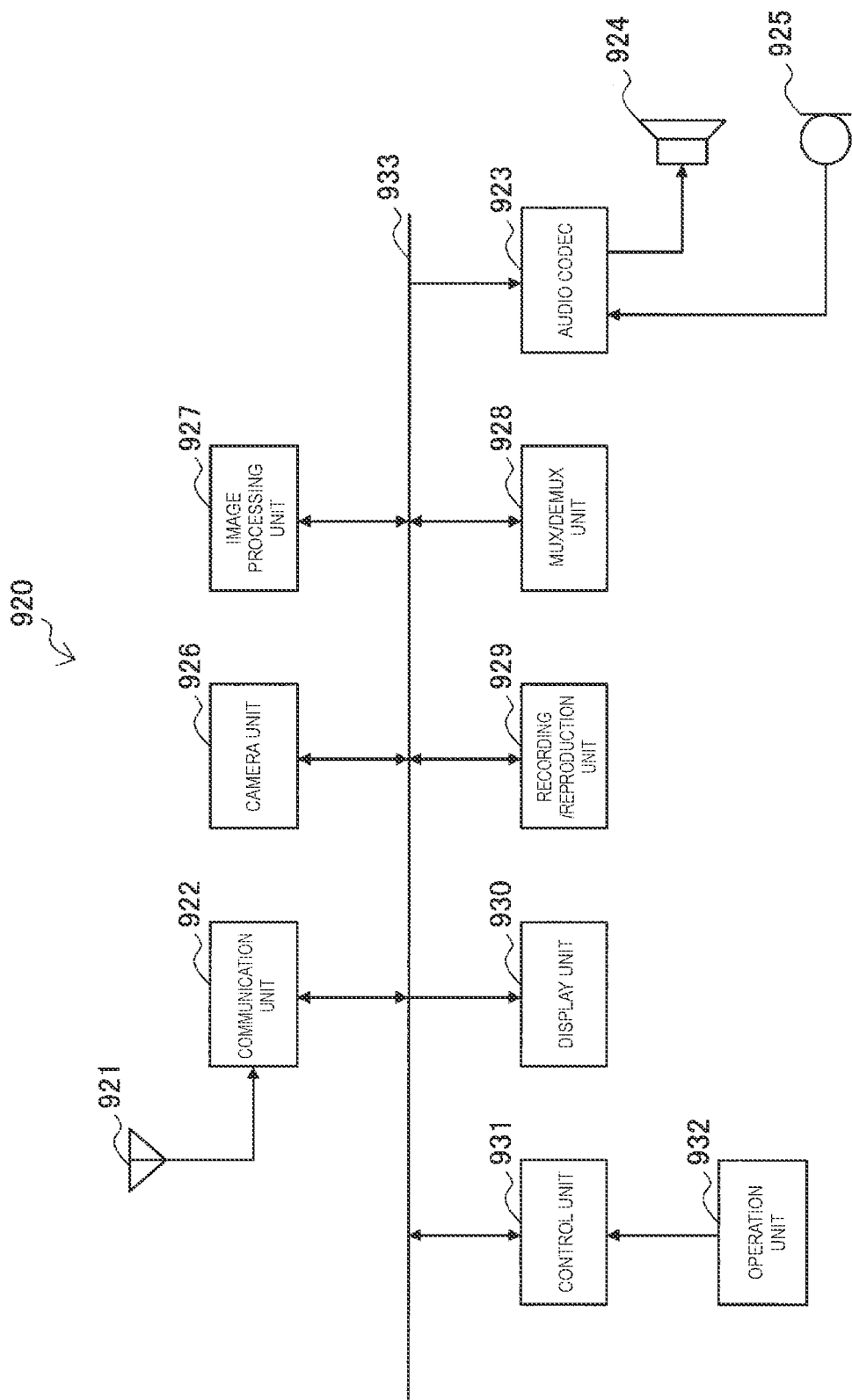
FIG. 18 is a block diagram illustrating an example of a schematic configuration of a mobile telephone.

FIG. 18 illustrates an example of a schematic configuration of a mobile telephone to which the above-described embodiments are applied. A mobile telephone 920 includes an antenna 921, a communication unit 922, an audio codec 923, a speaker 924, a microphone 925, a camera unit 926, an image processing unit 927, a multiplexing/demultiplexing unit 928, a recording/reproducing unit 929, a display unit 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 mutually connects the communication unit 922, the audio codec 923, the camera unit 926, the image processing unit 927, the multiplexing/demultiplexing unit 928, the recording/reproducing unit 929, the display unit 930, and the control unit 931.

The mobile telephone 920 performs actions such as transmitting/receiving an audio signal, transmitting/receiving an electronic mail or image data, capturing an image, and recording data in various operation modes including an audio call mode, a data communication mode, a photography mode, and a videophone mode.

In the audio call mode, an analog audio signal generated by the microphone 925 is supplied to the audio codec 923. The audio codec 923 then converts the analog audio signal into audio data, performs A/D conversion on the converted audio data, and compresses the data. The audio codec 923 thereafter outputs the compressed audio data to the communication unit 922. The communication unit 922 encodes and modulates the audio data to generate a transmission signal. The communication unit 922 then transmits the generated transmission signal to a base station (not shown) through the antenna 921. Furthermore, the communication unit 922 amplifies a radio signal received through the antenna 921, performs frequency conversion, and acquires a reception signal. The communication unit 922 thereafter demodulates and decodes the reception signal to generate the audio data and output the generated audio data to the audio codec 923. The audio codec 923 expands the audio data, performs D/A conversion on the data, and generates the analog audio signal. The audio codec 923 then supplies the generated audio signal to the speaker 924 to cause it to output the audio.

In the data communication mode, for example, the control unit 931 generates character data configuring an electronic mail, in accordance with a user operation detected through the operation unit 932. The control unit 931 further displays characters on the display unit 930. Moreover, the control unit 931 generates electronic mail data in accordance with an instruction to send it obtained from a user through the operation unit 932 and outputs the generated electronic mail data to the communication unit 922. The communication unit 922 encodes and modulates the electronic mail data to generate a transmission signal. Then, the communication unit 922 transmits the generated transmission signal to the base station (not shown) through the antenna 921. The communication unit 922 further amplifies a radio signal received through the antenna 921, performs frequency conversion, and acquires a reception signal. The communication unit 922 thereafter demodulates and decodes the reception signal, restores the electronic mail data, and outputs the restored electronic mail data to the control unit 931. The control unit 931 displays the content of the electronic mail on the display unit 930 as well as supplies the electronic mail data to a storage medium of the recording/reproducing unit 929 to cause the data to be recorded in the medium.

The recording/reproducing unit 929 includes an arbitrary storage medium that is readable and writable. For example, the storage medium may be a built-in storage medium such as a RAM or a flash memory, or may be an externally-mounted storage medium such as a hard disk, a magnetic disk, a magneto-optical disk, an optical disk, a USB memory, or a memory card.

In the photography mode, for example, the camera unit 926 images an object to generate image data and outputs the generated image data to the image processing unit 927. The image processing unit 927 encodes the image data input from the camera unit 926 and supplies an encoded stream to the storage medium of the recording/reproducing unit 929 to cause the encoded stream to be recorded in the medium.

Furthermore, in the image display mode, the recording/reproducing unit 929 reads out an encoded stream recorded on a storage medium, and outputs to the image processing unit 927. The image processing unit 927 decodes the encoded stream input from the recording/reproducing unit 929, supplies image data to the display unit 930, and causes the image to be displayed.

In the videophone mode, for example, the multiplexing/demultiplexing unit 928 multiplexes a video stream encoded by the image processing unit 927 and an audio stream input from the audio codec 923, and outputs the multiplexed stream to the communication unit 922. The communication unit 922 encodes and modulates the stream to generate a transmission signal. The communication unit 922 then transmits the generated transmission signal to the base station (not shown) through the antenna 921. Moreover, the communication unit 922 amplifies a radio signal received through the antenna 921, performs frequency conversion, and acquires a reception signal. The transmission signal and the reception signal can include an encoded bit stream. The communication unit 922 thus demodulates and decodes the reception signal to restore the stream, and outputs the restored stream to the multiplexing/demultiplexing unit 928. The multiplexing/demultiplexing unit 928 demultiplexes the video stream and the audio stream from the input stream and outputs the video stream and the audio stream to the image processing unit 927 and the audio codec 923, respectively. The image processing unit 927 decodes the video stream to generate video data. The video data is then supplied to the display unit 930, which displays a series of images. The audio codec 923 expands and performs D/A conversion on the audio stream to generate an analog audio signal. The audio codec 923 then supplies the generated audio signal to the speaker 924 to cause it to output the audio.

In the mobile telephone 920 configured in this way, the image processing unit 927 may include the functions of the image encoding apparatus 10 described above, for example. In other words, the image processing unit 927 may be configured to encode image data according to the method described in each of the above embodiments. With this arrangement, the mobile telephone 920 becomes able to execute bandwidth control through the scaling list process.

Also, in the mobile telephone 920 configured in this way, the image processing unit 927 may include the functions of the image decoding apparatus 60 described above, for example. In other words, the image processing unit 927 may be configured to decode encoded data according to the method described in each of the above embodiments. With this arrangement, the mobile telephone 920 becomes able to execute decoding according to bandwidth control through the scaling list process.

(3) Third Application Example:
Recording/Reproducing Apparatus

Figure 19:
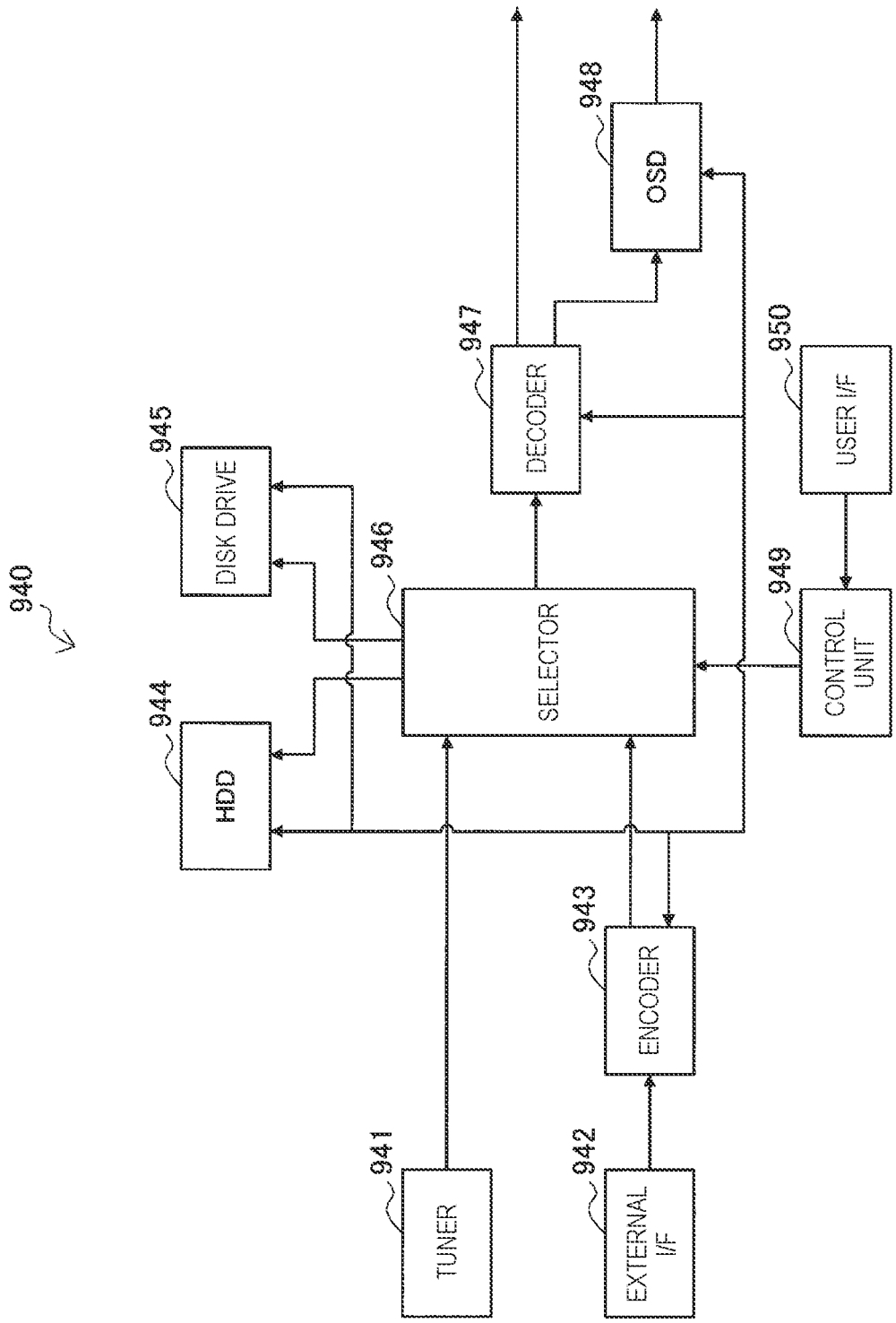
FIG. 19 is a block diagram illustrating an example of a schematic configuration of a recording/reproducing apparatus.

FIG. 19 illustrates an example of a schematic configuration of a recording/reproducing apparatus to which the above-described embodiments are applied. The recording/reproducing apparatus 940 encodes audio data and video data of a received broadcast program and records the data into a recording medium, for example. The recording/reproducing apparatus 940 may also encode audio data and video data acquired from another apparatus and record the data into the recording medium, for example. The recording/reproducing apparatus 940 reproduces the data recorded in the recording medium on a monitor and a speaker, for example, in response to a user instruction. In this case, recording/reproducing apparatus 940 decodes the audio data and the video data.

The recording/reproducing apparatus 940 includes a tuner 941, an external interface 942, an encoder 943, a hard disk drive (HDD) 944, a disk drive 945, a selector 946, a decoder 947, an on-screen display (OSD) 948, a control unit 949, and a user interface 950.

The tuner 941 extracts a signal of a desired channel from a broadcast signal received through an antenna (not shown) and demodulates the extracted signal. The tuner 941 then outputs an encoded bit stream obtained by the demodulation to the selector 946. That is, the tuner 941 has a role as transmission means in the recording/reproducing apparatus 940.

The external interface 942 is an interface which connects the recording/reproducing apparatus 940 with an external device or a network. The external interface 942 may be, for example, an IEEE 1394 interface, a network interface, a USB interface, or a flash memory interface. The video data and the audio data received through the external interface 942 are input to the encoder 943, for example. That is, the external interface 942 has a role as transmission means in the recording/reproducing apparatus 940.

The encoder 943 encodes the video data and the audio data in the case where the video data and the audio data input from the external interface 942 are not encoded. The encoder 943 thereafter outputs an encoded bit stream to the selector 946.

The HDD 944 records, into an internal hard disk, the encoded bit stream in which content data such as video and audio is compressed, various programs, and other data. The HDD 944 reads these data from the hard disk when the video and the audio are reproduced.

The disk drive 945 records and reads data into/from a recording medium attached to the disk drive. The recording medium attached to the disk drive 945 may be, for example, a DVD disk (such as DVD-Video, DVD-RAM, DVD-R, DVD-RW, DVD+R, or DVD+RW) or a Blu-ray (Registered Trademark) disk.

The selector 946 selects the encoded bit stream input from the tuner 941 or the encoder 943 when recording the video and audio, and outputs the selected encoded bit stream to the HDD 944 or the disk drive 945. When reproducing the video and audio, on the other hand, the selector 946 outputs the encoded bit stream input from the HDD 944 or the disk drive 945 to the decoder 947.

The decoder 947 decodes the encoded bit stream to generate the video data and the audio data. The decoder 904 then outputs the generated video data to the OSD 948 and the generated audio data to an external speaker.

The OSD 948 reproduces the video data input from the decoder 947 and displays the video. The OSD 948 may also superpose an image of a GUI such as a menu, buttons, or a cursor onto the displayed video.

The control unit 949 includes a processor such as a CPU and a memory such as a RAM and a ROM. The memory stores a program executed by the CPU as well as program data. The program stored in the memory is read by the CPU at the start-up of the recording/reproducing apparatus 940 and executed, for example. By executing the program, the CPU controls the operation of the recording/reproducing apparatus 940 in accordance with an operation signal that is input from the user interface 950, for example.

The user interface 950 is connected to the control unit 949. The user interface 950 includes a button and a switch for a user to operate the recording/reproducing apparatus 940 as well as a reception part which receives a remote control signal, for example. The user interface 950 detects a user operation through these components to generate an operation signal, and outputs the generated operation signal to the control unit 949.

In the recording/reproducing apparatus 940 configured in this way, the encoder 943 includes the functions of the image encoding apparatus 10 according to the embodiments described above. In addition, the decoder 947 includes the functions of the image decoding apparatus 60 according to the embodiments described above. With this arrangement, when the recording/reproducing apparatus 940 applies multiple (inverse) transforms to encode or decode, bandwidth control through the scaling list process becomes possible.

(4) Fourth Application Example: Imaging
Apparatus

Figure 20:
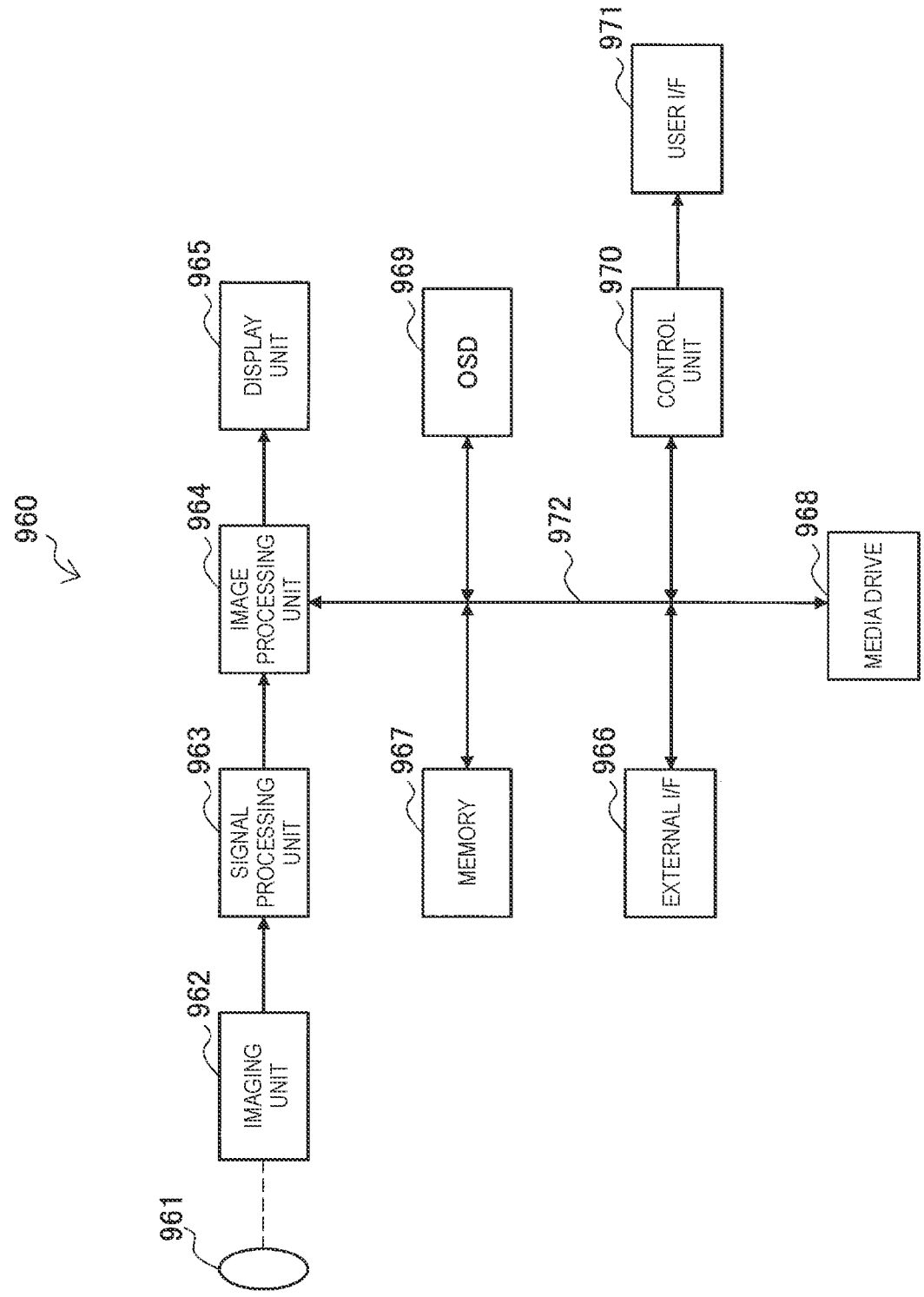
FIG. 20 is a block diagram illustrating an example of a schematic configuration of an imaging apparatus.

FIG. 20 illustrates an example of a schematic configuration of an imaging apparatus to which the above-described embodiments are applied. The imaging apparatus 960 images an object to generate an image, encodes image data, and records the data into a recording medium.

The imaging apparatus 960 includes an optical block 961, an imaging unit 962, a signal processing unit 963, an image processing unit 964, a display unit 965, an external interface 966, a memory 967, a media drive 968, an OSD 969, a control unit 970, a user interface 971, and a bus 972.

The optical block 961 is connected to the imaging unit 962. The imaging unit 962 is connected to the signal processing unit 963. The display unit 965 is connected to the image processing unit 964. The user interface 971 is connected to the control unit 970. The bus 972 mutually connects the image processing unit 964, the external interface 966, the memory 967, the media drive 968, the OSD 969, and the control unit 970.

The optical block 961 includes a focus lens and a diaphragm mechanism. The optical block 961 forms an optical image of an object on an imaging plane of the imaging unit 962. The imaging unit 962 includes an image sensor such as a CCD (Charge Coupled Device) or a CMOS (Complementary Metal Oxide Semiconductor) and performs photoelectric conversion to convert the optical image formed on the imaging plane into an image signal as an electric signal. Then, the imaging unit 962 outputs the image signal to the signal processing unit 963.

The signal processing unit 963 performs various camera signal processes such as a knee correction, a gamma correction and a color correction on the image signal input from the imaging unit 962. The signal processing unit 963 outputs the image data, on which the camera signal processes have been performed, to the image processing unit 964.

The image processing unit 964 encodes the image data input from the signal processing unit 963 and generates the encoded data. The image processing unit 964 then outputs the generated encoded data to the external interface 966 or the media drive 968. The image processing unit 964 also decodes the encoded data input from the external interface 966 or the media drive 968 to generate image data. The image processing unit 964 then outputs the generated image data to the display unit 965. Moreover, the image processing unit 964 may output to the display unit 965 the image data input from the signal processing unit 963 to cause the display unit 965 to display the image. Furthermore, the image processing unit 964 may superpose display data acquired from the OSD 969 onto the image that is output on the display unit 965.

The OSD 969 generates an image of a GUI such as a menu, buttons, or a cursor and outputs the generated image to the image processing unit 964.

The external interface 966 is configured as a USB input/output terminal, for example. The external interface 966 connects the imaging apparatus 960 with a printer when printing an image, for example. Moreover, a drive is connected to the external interface 966 as needed. A removable medium such as a magnetic disk or an optical disk is attached to the drive, for example, so that a program read from the removable medium can be installed to the imaging apparatus 960. The external interface 966 may also be configured as a network interface that is connected to a network such as a LAN or the Internet. That is, the external interface 966 has a role as transmission means in the imaging apparatus 960.

The recording medium attached to the media drive 968 may be an arbitrary removable medium that is readable and writable such as a magnetic disk, a magneto-optical disk, an optical disk, or a semiconductor memory. Furthermore, the recording medium may be attached to the media drive 968 in a fixed manner so that a non-transportable storage unit such as a built-in hard disk drive or a solid state drive (SSD) is configured, for example.

The control unit 970 includes a processor such as a CPU and a memory such as a RAM and a ROM. The memory stores a program executed by the CPU as well as program data. The program stored in the memory is read by the CPU at the start-up of the imaging apparatus 960 and then executed. By executing the program, the CPU controls the operation of the imaging apparatus 960 in accordance with an operation signal that is input from the user interface 971, for example.

The user interface 971 is connected to the control unit 970. The user interface 971 includes buttons and switches for a user to operate the imaging apparatus 960, for example. The user interface 971 detects a user operation through these components to generate an operation signal, and outputs the generated operation signal to the control unit 970.

In the imaging apparatus 960 configured in this way, the image processing unit 964 includes the functions of the image encoding apparatus 10 and the image decoding apparatus 60 according to the embodiments described above.

With this arrangement, when the imaging apparatus 960 applies multiple (inverse) transforms to encode or decode, bandwidth control through the scaling list process becomes possible.

(5) Fifth Application Example: Video Set

Figure 21:
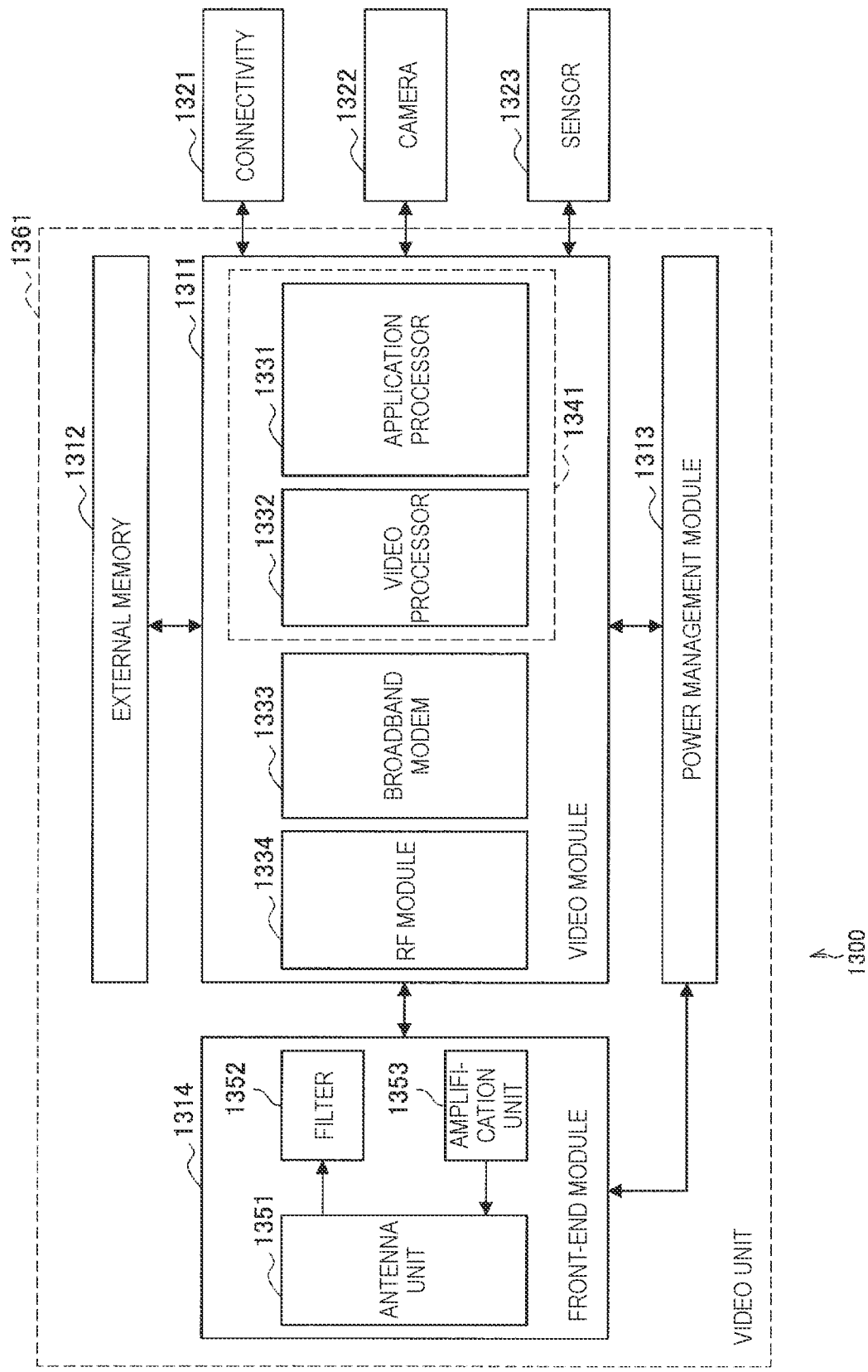
FIG. 21 is a block diagram illustrating one example of a schematic configuration of a video set.

Additionally, the present technology may also be implemented as any kind of configuration installed in any apparatus or an apparatus included in a system, such as a processor provided as a large-scale integration (LSI) chip or the like, a module that uses multiple processors or the like, a unit that uses multiple modules or the like, a set that further adds other functions to a unit (that is, a configuration of a part of an apparatus), or the like. FIG. 21 illustrates one example of a schematic configuration of a video set applying the present technology.

Recently, electronic devices are becoming more multifunctional, and in the development and manufacture of such electronic devices, in the case of implementing a partial configuration thereof for sale, offer, or the like, it has become commonplace not only to carry out the implementation as a configuration that includes a single function, but also to combine multiple configurations that include related functions and carry out the implementation as a single set including multiple functions.

The video set 1300 illustrated in FIG. 21 is such a multifunctional configuration, and is a combination of a device that includes functions related to image encoding and decoding (either one, or both) with a device that includes other functions related to such functions.

As illustrated in FIG. 21, the video set 1300 includes a module group such as a video module 1311, external memory 1312, a power management module 1313, and a front-end module 1314, and a device that includes related functions such as connectivity 1321, a camera 1322, and a sensor 1323.

A module is a part that collects several interrelated partial functions into a unified function. The specific physical configuration may be any configuration, but for example, it is conceivable to dispose and integrate multiple processors with respective functions, electronic circuit elements such as resistors and capacitors, other devices, and the like onto a circuit board or the like. It is also conceivable to combine a module with another module, processor, or the like to create a new module.

In the case of the example in FIG. 21, the video module 1311 is a combination of configurations that include functions related to image processing, and includes an application processor, a video processor, a broadband modem 1333, and an RF module 1334.

The processor is an integration of configurations having predetermined functions into a semiconductor chip as a system on a chip (SoC), and may also be designated a large-scale integration (LSI) chip or the like, for example. The configurations having predetermined functions may be logic circuits (hardware configurations), but may also be a CPU, ROM, RAM, and the like as well as a program executed using these (software configurations), and may also be a combination of both. For example, a processor may include logic circuits and CPU, ROM, RAM, and the like, and may be configured to realize a subset of the functions with the logic circuits (hardware configurations) while realizing other functions with programs (software configurations) executed on the CPU.

The application processor 1331 in FIG. 21 is a processor that executes an application related to image processing. To realize a predetermined function, the application executed in the application processor 1331 is able to not only execute computational processing, but is also able to control configurations inside and outside the video module 1311, such as the video processor 1332, for example, as necessary.

The video processor 1332 is a processor that includes functions related to image encoding/decoding (either one, or both).

The broadband modem 1333 performs digital modulation and the like to convert data (a digital signal) transmitted by wired or wireless (or both) broadband communication performed over a broadband connection such as the Internet or the public telephone network into an analog signal, and also performs demodulation to convert an analog signal received by such broadband communication into data (a digital signal). The broadband modem 1333 processes any kind of information, such as image data processed by the video processor 1332, a stream in which image data is encoded, application programs, and settings data, for example.

The RF module 1334 is a module that performs frequency conversion, modulation/demodulation, amplification, filter processing, and the like on radio frequency (RF) signals transmitted and received through an antenna. For example, the RF module 1334 generates an RF signal by performing frequency conversion and the like on a baseband signal generated by the broadband modem 1333. Also, for example, the RF module 1334 generates a baseband signal by performing frequency conversion and the like on an RF signal received via the front-end module 1314.

Note that as illustrated by the dashed line 1341 in FIG. 21, the application processor 1331 and the video processor 1332 may also be unified and configured as a single processor.

The external memory 1312 is a module provided externally to the video module 1311 that includes a storage device utilized by the video module 1311. The storage device of the external memory 1312 may be realized by any kind of physical configuration, but since the storage device typically is used to store large amounts of data such as image data in units of frames, it is desirable to realize the storage device with relatively inexpensive and high-capacity semiconductor memory such as dynamic random access memory (DRAM), for example.

The power management module 1313 manages and controls the supply of power to the video module 1311 (each configuration inside the video module 1311).

The front-end module 1314 is a module that provides a front-end function (a circuit on the antenna-side transmit/receive port) to the RF module 1334. As illustrated in FIG. 21, the front-end module 1314 includes an antenna unit 1351, a filter 1352, and an amplification unit 1353, for example.

The antenna unit 1351 includes an antenna that transmits and receives wireless signals, and a peripheral configuration thereof. The antenna unit 1351 transmits a signal supplied from the amplification unit 1353 as a wireless signal, and supplies a received wireless signal to the filter 1352 as an electric signal (RF signal). The filter 1352 performs filter processing and the like on the RF signal received through the antenna unit 1351, and supplies the processed RF signal to the RF module 1334. The amplification unit 1353 amplifies and supplies the RF signal supplied from the RF module 1334 to the antenna unit 1351.

The connectivity 1321 is a module that includes functions related to external connections. The physical configuration of the connectivity 1321 may be any configuration. For example, the connectivity 1321 includes a configuration having a communication function other than the communication standard supporting by the broadband modem 1333, an external input/output terminal, or the like.

For example, the connectivity 1321 may include a module having a communication function conforming to a wireless communication standard such as Bluetooth(registered trademark), IEEE 802.11 (for example, Wireless Fidelity (Wi-Fi (registered trademark))), near field communication (NFC), or Infrared Data Association (IrDA), and an antenna or the like that transmits and receives signals conforming to the standard. Also, for example, the connectivity 1321 may include a module having a communication function conforming to a wired communication function such as Universal Serial Bus (USB) or High-Definition Multimedia Interface (HDMI)(registered trademark), and a port conforming to the standard. Furthermore, for example, the connectivity 1321 may include a function of transmitting another kind of data (signal), such as an analog input/output terminal.

Note that the connectivity 1321 may include the transmission destination device of the data (signal). For example, the connectivity 1321 may include a drive (not only a drive for removable media, but also including a hard disk, a solid-state drive (SSD), network-attached storage (NAS), and the like) that reads and writes data with respect to a recording medium such as a magnetic disk, an optical disc, a magneto-optical disc, or semiconductor memory. Also, the connectivity 1321 may include devices (such as a monitor and a speaker) that output images and sound.

The camera 1322 is a module that has a function of imaging a subject and obtaining image data of the subject. The image data obtained by the imaging by the camera 1322 is supplied to the video processor 1332 and encoded, for example.

The sensor 1323 is a module having any type of sensor function, such as a sound sensor, an ultrasonic sensor, a light sensor, an illumination sensor, an infrared sensor, an image sensor, a rotation sensor, an angle sensor, an angular velocity sensor, a speed sensor, an acceleration sensor, an inclination sensor, a magnetic field sensor, a shock sensor, or a temperature sensor, for example. Data detected by the sensor 1323 is supplied to the application processor 1331 and utilized by an application and the like, for example.

The configurations described as a module above may also be realized as a processor, while conversely, the configurations described as a processor may also be realized as a module.

In the video set 1300 with a configuration like the above, the present technology can be applied to the video processor 1332 as described later. Consequently, the video set 1300 may be carried out as a set applying the present technology.

Exemplary Configuration of Video Processor

Figure 22:
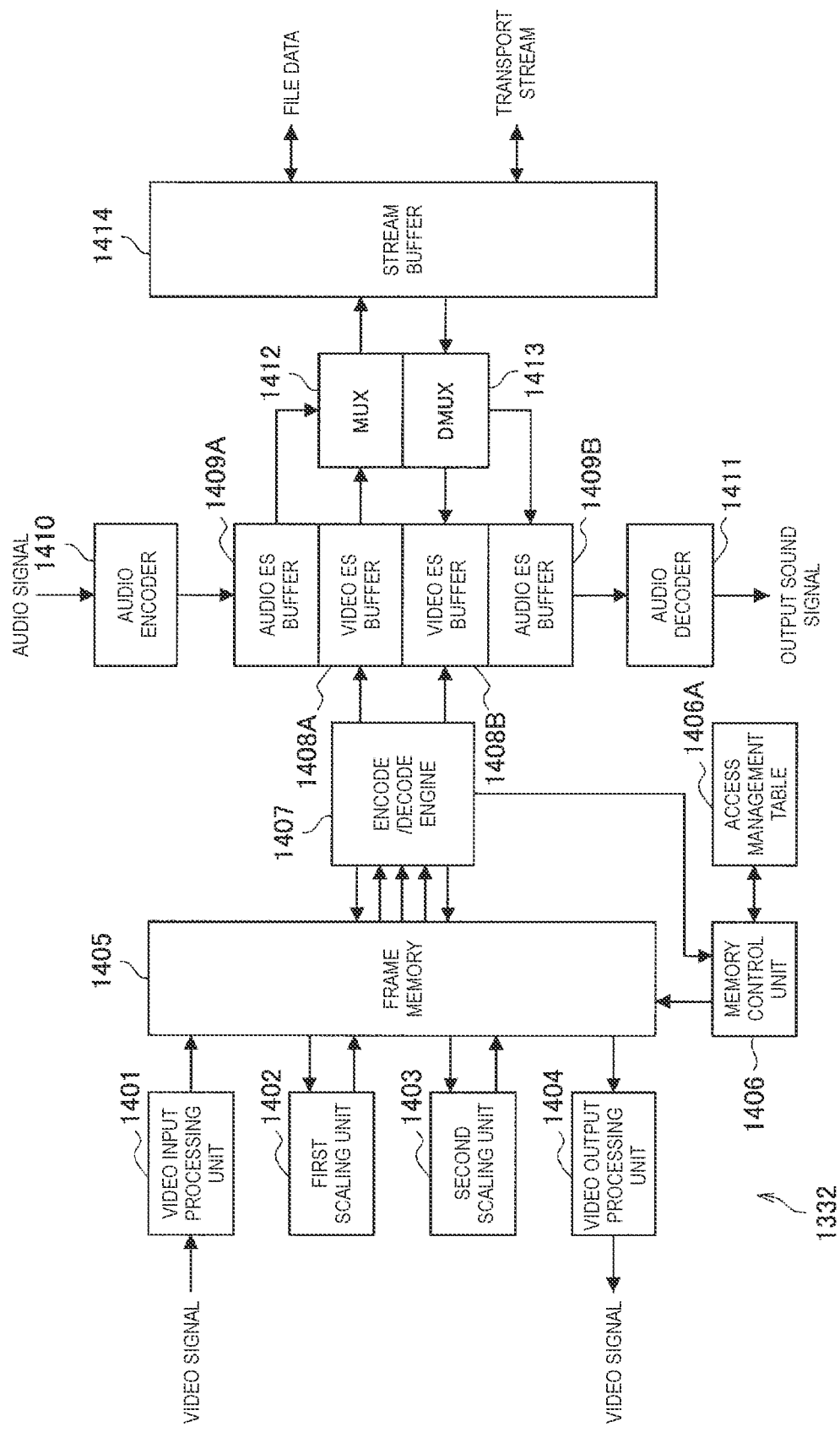
FIG. 22 is a block diagram illustrating one example of a schematic configuration of a video processor.

FIG. 22 illustrates one example of a schematic configuration of the video processor 1332 (FIG. 21) applying the present technology.

In the case of the example in FIG. 22, the video processor 1332 includes a function of receiving the input of a video signal and an audio signal and encoding these signals according to a predetermined method, and a function of decoding encoded video data and audio data, and reproducing and outputting a video signal and an audio signal.

As illustrated in FIG. 22, the video processor 1332 includes a video input processing unit 1401, a first image enlargement/reduction unit 1402, a second image enlargement/reduction unit 1403, a video output processing unit 1404, frame memory 1405, and a memory control unit 1406.

Also, the video processor 1332 includes an encode/decode engine 1407, video elementary stream (ES) buffers 1408A and 1408B, and audio ES buffers 1409A and 1409B. Additionally, the video processor 1332 includes an audio encoder 1410, an audio decoder 1411, a multiplexer (MUX) 1412, a demultiplexer (DMUX) 1413, and a stream buffer 1414.

The video input processing unit 1401 acquires a video signal input from the connectivity 1321 (FIG. 21) or the like, for example, and converts the video signal into digital image data. The first image enlargement/reduction unit 1402 performs format conversion, image enlargement/reduction processing, and the like on the image data. The second image enlargement/reduction unit 1403 performs a process of enlarging or reducing the image according to the format at the destination to which to output through the video output processing unit 1404, format conversion and image enlargement/reduction processing similar to the first image enlargement/reduction unit 1402, and the like on the image data. The video output processing unit 1404 performs format conversion, conversion to an analog signal, and the like on the image data, and outputs the result to the connectivity 1321 for example as a reproduced video signal.

The frame memory 1405 is memory for image data shared by the video input processing unit 1401, the first image enlargement/reduction unit 1402, the second image enlargement/reduction unit 1403, the video output processing unit 1404, and the encode/decode engine 1407. The frame memory 1405 is realized as semiconductor memory such as DRAM, for example.

The memory control unit 1406 receives a synchronization signal from the encode/decode engine 1407, and controls the access and writes and reads to the frame memory 1405 in accordance with an access schedule of access to the frame memory 1405 written in an access management table 1406A. The access management table 1406A is updated by the memory control unit 1406 according to processes executed by the encode/decode engine 1407, the first image enlargement/reduction unit 1402, the second image enlargement/reduction unit 1403, and the like.

The encode/decode engine 1407 executes a process of encoding image data as well as a process of decoding a video stream, which is data in which image data is encoded. For example, the encode/decode engine 1407 encodes image data read from the frame memory 1405, and successively writes the encoded data to the video ES buffer 1408A as a video stream. Also, for example, the encode/decode engine 1407 successively reads and decodes a video stream from the video ES buffer 1408B, and writes the decoded data to the frame memory 1405 as image data. During this encoding and decoding, the encode/decode engine 1407 uses the frame memory 1405 as a work area. Also, the encode/decode engine 1407 outputs a synchronization signal to the memory control unit 1406 at the timing of starting the process for each macroblock, for example.

The video ES buffer 1408A buffers and supplies a video stream generated by the encode/decode engine 1407 to the multiplexer (MUX) 1412. The video ES buffer 1408B buffers and supplies a video stream supplied from the demultiplexer (DMUX) 1413 to the encode/decode engine 1407.

The audio ES buffer 1409A buffers and supplies an audio stream generated by the audio encoder 1410 to the multiplexer (MUX) 1412. The audio ES buffer 1409B buffers and supplies an audio stream supplied from the demultiplexer (DMUX) 1413 to the audio decoder 1411.

The audio encoder 1410 for example digitally converts an audio signal input from the connectivity 1321 or the like, for example, and encodes the audio signal according to a predetermined method such as the MPEG Audio method or the AudioCode number 3 (AC3) method, for example. The audio encoder 1410 successively writes an audio stream, which is data in which an audio signal is encoded, to the audio ES buffer 1409A. The audio decoder 1411 decodes an audio stream supplied from the audio ES buffer 1409B, performs conversion to an analog signal and the like, for example, and supplies the result to the connectivity 1321 and the like for example as a reproduced audio signal.

The multiplexer (MUX) 1412 multiplexes a video stream and an audio stream. The multiplexing method (that is, the format of the bit stream generated by multiplexing) may be any method. Additionally, during this multiplexing, the multiplexer (MUX) 1412 is also able to add predetermined header information or the like to the bit stream. In other words, the multiplexer (MUX) 1412 is able to convert the format of the streams by multiplexing. For example, by multiplexing a video stream and an audio stream, the multiplexer (MUX) 1412 converts the streams to a transport stream, which is a bit stream in a format for transmission. Also, for example, by multiplexing a video stream and an audio stream, the multiplexer (MUX) 1412 converts the streams to data (file data) in a file format for recording.

The demultiplexer (DMUX) 1413 demultiplexes a bit stream in which a video stream and an audio stream are multiplexed, according to a method corresponding to the multiplexed by the multiplexer (MUX) 1412. In other words, the demultiplexer (DMUX) 1413 extracts the video stream and the audio stream (separates the video stream and the audio stream) from a bit stream read out from the stream buffer 1414. In other words, the demultiplexer (DMUX) 1413 is able to convert the format of the stream by demultiplexing (an inverse conversion of the conversion by the multiplexer (MUX) 1412). For example, the demultiplexer (DMUX) 1413 is able to acquire a transport stream supplied from the connectivity 1321, the broadband modem 1333, or the like for example via the stream buffer 1414, and by demultiplexing, is able to convert the transport stream into a video stream and an audio stream. Also, for example, the demultiplexer (DMUX) 1413 is able to acquire file data read out from any of various types of recording media by the connectivity 1321, for example via the stream buffer 1414, and by demultiplexing, is able to convert the file data into a video stream and an audio stream.

The stream buffer 1414 buffers a bit stream. For example, the stream buffer 1414 buffers a transport stream supplied from the multiplexer (MUX) 1412, and at a predetermined timing, or on the basis of an external request or the like, supplies the transport stream to the connectivity 1321, the broadband modem 1333, or the like, for example.

Also, for example, the stream buffer 1414 buffers file data supplied from the multiplexer (MUX) 1412, and at a predetermined timing, or on the basis of an external request or the like, supplies the file data to the connectivity 1321 or the like, for example, and causes the file data to be recorded on any of various types of recording media.

Furthermore, the stream buffer 1414 buffers a transport stream acquired via the connectivity 1321, the broadband modem 1333, and the like, for example, and at a predetermined timing, or on the basis of an external request or the like, supplies the transport stream to the demultiplexer (DMUX) 1413.

Additionally, the stream buffer 1414 buffers file data read out from any of various types of recording media in the connectivity 1321 or the like, for example, and at a predetermined timing, or on the basis of an external request or the like, supplies the file data to the demultiplexer (DMUX) 1413.

Next, an example of the operation of the video processor 1332 with such a configuration will be described. For example, a video signal input into the video processor 1332 from the connectivity 1321 or the like is converted to digital image data of a predetermined format such as 4:2:2 Y/Cb/Cr format in the video input processing unit 1401, and is successively written to the frame memory 1405. The digital image data is read out to the first image enlargement/reduction unit 1402 or the second image enlargement/reduction unit 1403, subjected to a format conversion to a predetermined format such as 4:2:0 Y/Cb/Cr or the like and an enlargement/reduction process, and again written to the frame memory 1405. The image data is encoded by the encode/decode engine 1407, and written to the video ES buffer 1408A as a video stream.

Also, an audio signal input into the video processor 1332 from the connectivity 1321 or the like is encoded by the audio encoder 1410, and written to the audio ES buffer 1409A as an audio stream.

The video stream in the video ES buffer 1408A and the audio stream in the audio ES buffer 1409A are read out and multiplexed by the multiplexer (MUX) 1412, and converted to a transport stream, file data, or the like. The transport stream generated by the multiplexer (MUX) 1412 is buffered in the stream buffer 1414, and then output to an external network via the connectivity 1321, the broadband modem 1333, or the like, for example. Also, the file data generated by the multiplexer (MUX) 1412 is buffered in the stream buffer 1414, and then output to the connectivity 1321 or the like, for example, and recorded to any of various types of recording media.

Also, a transport stream input into the video processor 1332 from an external network via the connectivity 1321, the broadband modem 1333, or the like for example is buffered in the stream buffer 1414, and then demultiplexed by the demultiplexer (DMUX) 1413. Also, file data read out from any of various types of recording media in the connectivity 1321 or the like, for example, and input into the video processor 1332 is buffered in the stream buffer 1414, and then demultiplexed by the demultiplexer (DMUX) 1413. In other words, a transport stream or file data input into the video processor 1332 is separated into a video stream and an audio stream by the demultiplexer (DMUX) 1413.

The audio stream is supplied to the audio decoder 1411 via the audio ES buffer 1409B and decoded, and an audio signal is reproduced. Also, the video stream, after being written to the video ES buffer 1408B, is successively read out and decoded by the encode/decode engine 1407, and written to the frame memory 1405. The decoded image data is subjected to an enlargement/reduction process by the second image enlargement/reduction unit 1403, and written to the frame memory 1405. Subsequently, the decoded image data is read out to the video output processing unit 1404, format-converted to a predetermined format such as 4:2:2 Y/Cb/Cr format, additionally converted to an analog signal, and a video signal is reproduced and output.

In the case of applying the present technology to the video processor 1332 configured in this way, it is sufficient to apply the present technology according to each of the embodiments described above to the encode/decode engine 1407. In other words, for example, the encode/decode engine 1407 may include the functions of the image encoding apparatus 10 or the functions of the image decoding apparatus 60 described above, or both. With this arrangement, the video processor 1332 is able to obtain effects similar to each of the embodiments described above with reference to FIGS. 1 to 15.

Note that in the encode/decode engine 1407, the present technology (that is, the functions of the image encoding apparatus 10, the functions of the image decoding apparatus 60, or both) may be realized by hardware such as a logic circuit or the like, may be realized by software such as an embedded program, or may be realized by both of the above.

Another Exemplary Configuration of Video Processor

Figure 23:
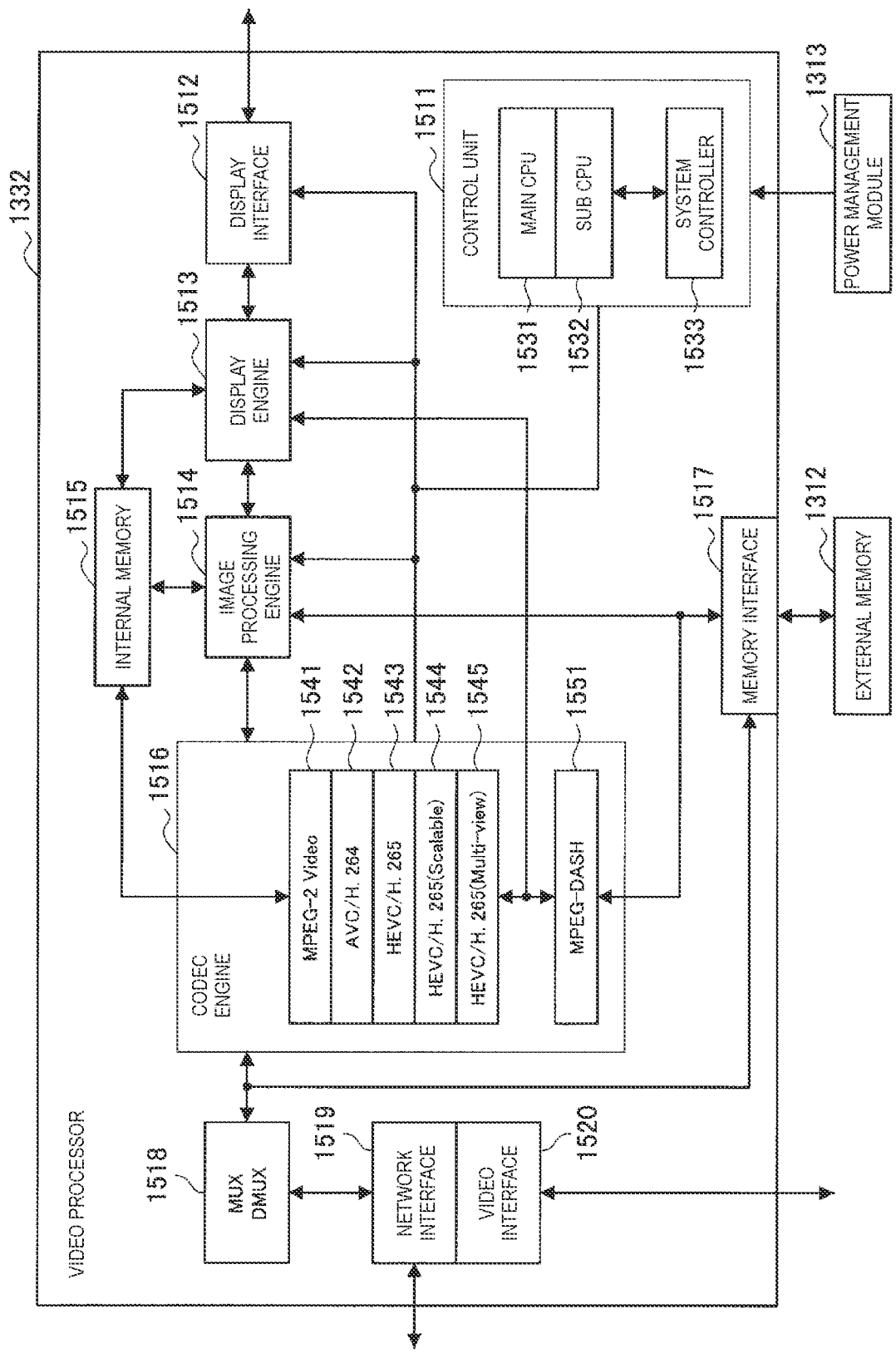
FIG. 23 is a block diagram illustrating another example of a schematic configuration of a video processor.

FIG. 23 illustrates another example of a schematic configuration of the video processor 1332 applying the present technology. In the case of the example in FIG. 23, the video processor 1332 includes a function of encoding/decoding video data according to a predetermined method.

More specifically, as illustrated in FIG. 23, the video processor 1332 includes a control unit 1511, a display interface 1512, a display engine 1513, an image processing engine 1514, and internal memory 1515. Also, the video processor 1332 includes a codec engine 1516, a memory interface 1517, a multiplexer/demultiplexer (MUX DMUX) 1518, a network interface 1519, and a video interface 1520.

The control unit 1511 controls the operation of each processing unit in the video processor 1332, such as the display interface 1512, the display engine 1513, the image processing engine 1514, and the codec engine 1516.

As illustrated in FIG. 23, the control unit 1511 includes a main CPU 1531, a sub CPU 1532, and a system controller 1533, for example. The main CPU 1531 executes a program or the like for controlling the operation of each processing unit in the video processor 1332. The main CPU 1531 generates control signals in accordance with the program or the like, and supplies the control signals to each processing unit (in other words, controls the operation of each processing unit). The sub CPU 1532 fulfills a supplementary role to the main CPU 1531. For example, the sub CPU 1532 executes child processes, subroutines, and the like of the program or the like executed by the main CPU 1531. The system controller 1533 controls the operations of the main CPU 1531 and the sub CPU 1532, such as specifying programs to be executed by the main CPU 1531 and the sub CPU 1532.

The display interface 1512, under control by the control unit 1511, outputs image data to the connectivity 1321 and the like, for example. For example, the display interface 1512 converts digital image data to an analog signal and outputs an analog signal, or outputs the digital image data directly, as a reproduced video signal to a monitor apparatus or the like of the connectivity 1321.

The display engine 1513, under control by the control unit 1511, performs various conversion processes such as format conversion, size conversion, and gamut conversion on the image data to match the hardware specs of the monitor apparatus or the like that is to display the image.

The image processing engine 1514, under control by the control unit 1511 performs predetermined image processing on the image data, such as filter processing for improving image quality, for example.

The internal memory 1515 is memory provided inside the video processor 1332, and shared by the display engine 1513, the image processing engine 1514, and the codec engine 1516. For example, the internal memory 1515 is used to exchange data between the display engine 1513, the image processing engine 1514, and the codec engine 1516. For example, the internal memory 1515 stores data supplied from the display engine 1513, the image processing engine 1514, or the codec engine 1516, and as necessary (for example, in response to a request), supplies the data to the display engine 1513, the image processing engine 1514, or the codec engine 1516. The internal memory 1515 may be realized by any kind of storage device, but since the storage device typically is used to store small amounts of data such as image data in units of blocks, parameters, and the like, it is desirable to realize the storage device with semiconductor memory that is relatively (for example, compared to the external memory 1312) small in capacity but has a fast response speed, such as static random access memory (SRAM), for example.

The codec engine 1516 executes processes related to the encoding and decoding of image data. The encoding/decoding method supported by the codec engine 1516 may be any method, and there may be one or multiple such methods. For example, the codec engine 1516 may be provided with a codec function for multiple encoding/decoding methods, and may be configured to encode or decode image data by selecting from among the multiple methods.

In the example illustrated in FIG. 23, the codec engine 1516 includes MPEG-2 Video 1541, AVC/H.264 1542, HEVC/H.265 1543, HEVC/H.265 (Scalable) 1544, HEVC/H.265 (Multi-view) 1545, and MPEG-DASH 1551 as function blocks of codec-related processing, for example.

The MPEG-2 Video 1541 is a function block that encodes and decodes image data according to the MPEG-2 method. The AVC/H.264 1542 is a function block that encodes and decodes image data according to the AVC method. The HEVC/H.265 1543 is a function block that encodes and decodes image data according to the HEVC method. The HEVC/H.265 (Scalable) 1544 is a function block that scalably encodes and scalably decodes image data according to the HEVC method. The HEVC/H.265 (Multi-view) 1545 is a function block that multi-view encodes and multi-view decodes image data according to the HEVC method.

The MPEG-DASH 1551 is a function block that transmits and receives image data according to the MPEG Dynamic Adaptive Streaming over HTTP (MPEG-DASH) method. MPEG-DASH is a technology that uses the Hypertext Transfer Protocol (HTTP) to stream video, one feature of which being that appropriate encoded data is selected and transmitted in units of segments from among multiple sets of encoded data having different resolutions or the like prepared in advance. The MPEG-DASH 1551 executes the generation, transmission control, and the like of a stream conforming to the standard, while for the encoding/decoding of image data, the MPEG-2 Video 1541 to the HEVC/H.265 (Multi-view) 1545 are used.

The memory interface 1517 is an interface for the external memory 1312. Data supplied from the image processing engine 1514 and the codec engine 1516 is supplied to the external memory 1312 through the memory interface 1517. Also, data read out from the external memory 1312 is supplied to the video processor 1332 (the image processing engine 1514 or the codec engine 1516) through the memory interface 1517.

The multiplexer/demultiplexer (MUX DMUX) 1518 multiplexes and demultiplexes various image-related data, such as a bit stream of encoded data, image data, a video signal, and the like. The multiplexing/demultiplexing method may be any method. For example, when multiplexing, the multiplexer/demultiplexer (MUX DMUX) 1518 is not only able to collect multiple pieces of data into a single piece of data, but also add predetermined header information and the like to the data. Also, when demultiplexing, the multiplexer/demultiplexer (MUX DMUX) 1518 is not only able to divide a single piece of data into multiple pieces of data, but also add predetermined header information and the like to each divided piece of data. In other words, the multiplexer/demultiplexer (MUX DMUX) 1518 is able to convert the format of data by multiplexing/demultiplexing. For example, by multiplexing a bit stream, the multiplexer/demultiplexer (MUX DMUX) 1518 is able to convert the bit stream to a transport stream, which is a bit stream in a format for transmission, or to data in a file format (file data) for recording. Obviously, by demultiplexing, the inverse conversion is also possible.

The network interface 1519 is an interface for the broadband modem 1333, the connectivity 1321, and the like, for example. The video interface 1520 is an interface for the connectivity 1321, the camera 1322, and the like, for example.

Next, an example of the operation of such a video processor 1332 will be described. For example, when a transport stream is received from an external network through the connectivity 1321, the broadband modem 1333, or the like, the transport stream is supplied to the multiplexer/demultiplexer (MUX DMUX) 1518 through the network interface 1519 and demultiplexed, and decoded by the codec engine 1516. The image data obtained by the decoding of the codec engine 1516 is, for example, subjected to predetermined image processing by the image processing engine 1514, subjected to a predetermined conversion by the display engine 1513, supplied to the connectivity 1321 or the like for example through the display interface 1512, and the image is displayed on a monitor. Also, for example, the image data obtained by the decoding of the codec engine 1516 is re-encoded by the codec engine 1516, multiplexed and converted to file data by the multiplexer/demultiplexer (MUX DMUX) 1518, output to the connectivity 1321 or the like for example through the video interface 1520, and recorded on any of various types of recording media.

Furthermore, for example, file data of encoded data in which image data is encoded that is read out from a recording medium not illustrated by the connectivity 1321 or the like is supplied to the multiplexer/demultiplexer (MUX DMUX) 1518 through the video interface 1520 and demultiplexed, and decoded by the codec engine 1516. The image data obtained by the decoding of the codec engine 1516 is subjected to predetermined image processing by the image processing engine 1514, subjected to a predetermined conversion by the display engine 1513, supplied to the connectivity 1321 or the like for example through the display interface 1512, and the image is displayed on a monitor. Also, for example, the image data obtained by the decoding of the codec engine 1516 is re-encoded by the codec engine 1516, multiplexed and converted to a transport stream by the multiplexer/demultiplexer (MUX DMUX) 1518, supplied to the connectivity 1321, the broadband modem 1333, or the like for example through the network interface 1519, and transmitted to another apparatus not illustrated.

Note that the exchange of image data and other data between each of the processing units inside the video processor 1332 is performed by utilizing the internal memory 1515 and the external memory 1312, for example. Additionally, the power management module 1313 controls the supply of power to the control unit 1511, for example.

In the case of applying the present technology to the video processor 1332 configured in this way, it is sufficient to apply the present technology according to each of the embodiments described above to the codec engine 1516. In other words, for example, it is sufficient for the codec engine 1516 to include the functions of the image encoding apparatus 10 or the functions of the image decoding apparatus 60 described above, or both. With this arrangement, the video processor 1332 is able to obtain effects similar to each of the embodiments described above with reference to FIGS. 1 to 15.

Note that in the codec engine 1516, the present technology (that is, the functions of the image encoding apparatus 10) may be realized by hardware such as a logic circuit or the like, may be realized by software such as an embedded program, or may be realized by both of the above.

The above illustrates two configurations of the video processor 1332 as examples, but the configuration of the video processor 1332 may be any configuration, and may be a configuration other than the two examples described above. Also, the video processor 1332 may be configured as a single semiconductor chip, but may also be configured as multiple semiconductor chips. For example, a three-dimensionally stacked LSI chip in which multiple semiconductors are stacked is possible. Also, a configuration realized by multiple LSI chips is possible.

Example of Application to Apparatus

The video set 1300 can be embedded into any of various types of apparatus that process image data. For example, the video set 1300 can be embedded into the television apparatus 900 (FIG. 17), the mobile telephone 920 (FIG. 18), the recording/reproducing apparatus 940 (FIG. 19), the imaging apparatus 960 (FIG. 20), and the like. By embedding the video set 1300, the apparatus is able to obtain effects similar to each of the embodiments described above with reference to FIGS. 1 to 15.

Note that as long as the video processor 1332 is included, even a part of each configuration of the video set 1300 described above can be carried out as a configuration applying the present technology. For example, it is possible to carry out only the video processor 1332 as a video processor applying the present technology. Also, for example, the processor illustrated by the dashed line 1341 as described above, the video module 1311, and the like can be carried out as a processor, module, or the like applying the present technology. Furthermore, for example, the video module 1311, the external memory 1312, the power management module 1313, and the front-end module 1314 can also be combined and carried out as a video unit 1361 applying the present technology. With any of these configurations, it is possible to obtain effects similar to each of the embodiments described above with reference to FIGS. 1 to 15.

In other words, as long as the video processor 1332 is included, any type of configuration can be embedded into any of various types of apparatus that process image data, similarly to the case of the video set 1300. For example, the video processor 1332, the processor illustrated by the dashed line 1341, the video module 1311, or the video unit 1361 can be embedded into the television apparatus 900 (FIG. 17), the mobile telephone 920 (FIG. 18), the recording/reproducing apparatus 940 (FIG. 19), the imaging apparatus 960 (FIG. 20), and the like. Additionally, by embedding any configuration applying the present technology, the apparatus is able to obtain effects similar to each of the embodiments described above with reference to FIGS. 1 to 15, similarly to the video set 1300.

Sixth Application Example: Network System

Additionally, the present technology is also applicable to a network system that includes multiple apparatus. FIG. 24 illustrates one example of a schematic configuration of a network system applying the present technology.

The network system 1600 illustrated in FIG. 24 is a system in which devices exchange information related to images (moving images) with each other over a network. The cloud service 1601 of the network system 1600 is a system that provides a service related to images (moving images) to terminals such as a computer 1611, audio-visual (AV) equipment 1612, a mobile information processing terminal 1613, and an Internet of Things (IoT) device 1614 communicably connected to the cloud service 1601. For example, the cloud service 1601 provides a service of supplying image (moving image) content to terminals, like what is called video streaming (on-demand or live streaming). As another example, the cloud service 1601 provides a backup service that receives and stores image (moving image) content from terminals. As another example, the cloud service 1601 provides a service of mediating the exchange of image (moving image) content between terminals.

The physical configuration of the cloud service 1601 may be any configuration. For example, the cloud service 1601 may include various servers, such as a server that saves and manages moving images, a server that delivers moving images to terminals, a server that acquires moving images from terminals, and a server that manages users (terminals) and payments, as well as any type of network, such as the Internet or a LAN.

The computer 1611 includes an information processing apparatus such as a personal computer, server, or workstation, for example. The AV equipment 1612 includes image processing apparatus such as a television receiver, a hard disk recorder, a game console, or a camera, for example. The mobile information processing terminal 1613 includes a mobile information processing apparatus such as a notebook personal computer, a tablet terminal, a mobile telephone, or a smartphone, for example. The IoT device 1614 includes any object that executes image-related processing, such as a machine, an electric appliance, a piece of furniture, some other thing, an IC tag, or a card-shaped device, for example. These terminals all include a communication function, and are able to connect to (establish a session with) the cloud service 1601 and exchange information with (that is, communicate with) the cloud service 1601. Also, each terminal is also able to communicate with another terminal. Communication between terminals may be performed by going through the cloud service 1601, or may be performed without going through the cloud service 1601.

When the present technology is applied to the network system 1600 as above, and image (moving image) data is exchanged between terminals or between a terminal and the cloud service 1601, the image data may be encoded/decoded as described above in each of the embodiments. In other words, the terminals (from the computer 1611 to the IoT device 1614) and the cloud service 1601 each may include the functions of the image encoding apparatus 10 and the image decoding apparatus 60 described above. With this arrangement, when applying multiple (inverse) transforms to encode or decode, bandwidth control through the scaling list process becomes possible.

5. Conclusion

According to the embodiments of the present disclosure as described above, bandwidth control using a scaling list is possible even in the case in which multiple transforms are applied.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Control information related to the present technology described in each of the above embodiments may be transmitted from the encoding side to the decoding side. For example, control information that controls whether or not to allow (or deny) the application of the present technology described above may be transmitted. Also, for example, control information that specifies an upper limit, a lower limit, or both of a block size that allows (or denies) the application of the present technology described above may be transmitted.

The present technology may be applied to any type of image encoding/decoding that performs a primary transform, a secondary transform, and encoding (decoding, an inverse secondary transform, and an inverse primary transform). In other words, the specifications of transform (inverse transform), quantization (inverse quantization), encoding (decoding), prediction, and the like may be any specifications, and are not limited to the example described above. For example, in the transform (inverse transform), a (inverse) transform other than the (inverse) primary transform and the (inverse) secondary transform (in other words, three or more (inverse) transforms) may be performed. Also, the encoding (decoding) may be a lossless method or a lossy method. Additionally, the quantization (inverse quantization), prediction, and the like may also be omitted. Also, processes not described above, such as filter processing, may also be performed.

Further, the effects described in this specification are merely illustrative or exemplified effects, and are not limitative. That is, with or in the place of the above effects, the technology according to the present disclosure may achieve other effects that are clear to those skilled in the art from the description of this specification. Additionally, the present technology may also be configured as below.

(1)
An image processing apparatus including:
a process control section that controls a scaling list process on the basis of transform information related to a transform applied to a processing target block.

(2)
The image processing apparatus according to (1), in which
the process control section additionally controls an inverse transform process related to an inverse transform of a transform applied to a processing target block, on the basis of the transform information.

(3)
The image processing apparatus according to (2), in which
the process control section controls an input into the inverse transform process on the basis of the transform information.

(4)
The image processing apparatus according to any one of (1) to (3), in which
the process control section makes a determination of whether or not to perform an inverse transform process related to an inverse transform of another transform different from a transform with respect to prediction error data, which is a difference between image data and predicted image data, on the basis of the transform information.

(5)
The image processing apparatus according to (4), in which
the process control section controls an input into the scaling list process according to the determination.

(6)
The image processing apparatus according to (5), in which
in a case of determining to perform the inverse transform process, the process control section controls the input into the scaling list process such that coefficient data after the inverse transform process becomes input data into the scaling list process.

(7)
The image processing apparatus according to (5) or (6), in which
in a case of determining not to perform the inverse transform process, the process control section controls the input into the scaling list process such that coefficient data of inverse quantization becomes input data into the scaling list process.

(8)
The image processing apparatus according to (4), in which
the process control section specifies a scaling list to be used in the scaling list process according to the determination.

(9)
The image processing apparatus according to (8), in which
in a case of determining to perform the inverse transform process, the process control section specifies a scaling list to be used in the scaling list process by an inner product operation of a predetermined scaling list and the other transform.

(10)
The image processing apparatus according to (8) or (9), in which the inverse transform process is performed on the basis of a convolution operation.

(11)
The image processing apparatus according to (1), in which the transform information includes information indicating whether or not a predetermined transform has been applied to the processing target block.

(12)
The image processing apparatus according to (1), in which the transform information includes information indicating the number of transforms applied to the processing target block.

(13)
An image processing method including:
controlling, by a processor, a scaling list process on the basis of transform information related to a transform applied to a processing target block of a processing target.

(14)

A program causing a computer to execute a function of:

controlling a scaling list process on the basis of transform information related to a transform applied to a processing target block.

REFERENCE SIGNS LIST 10 image encoding apparatus
12 control section
13 subtraction section
14 processing section
16 lossless encoding section
17 accumulation buffer
21 inverse processing section
23 addition section
30 intra-prediction section
40 inter-prediction section
60 image decoding apparatus
61 accumulation buffer
62 lossless decoding section
63 inverse processing section
65 addition section
70 frame memory
80 intra-prediction section
90 inter-prediction section
141 primary transform section
142 scaling list processing section
143 process control section
144 secondary transform section
145 quantization section
146 process control section
147 transform section
148 quantization/scaling list processing section
631 inverse quantization section
632 process control section
633 inverse secondary transform section
634 scaling list processing section
635 inverse primary transform section
636 process control section
637 inverse quantization/scaling list processing section
638 inverse transform section

What is claimed is:

1. An image decoding apparatus, comprising:
circuitry configured to:
perform inverse quantization of quantized data of image data based on a first equation including a quantization parameter but not including a two-dimensional scaling factor for a scaling list process;
acquire transform information indicating whether a secondary transform different from a primary transform is applied to a processing target block of the image data; and
perform the scaling list process to acquire a primary coefficient for an inverse transform process of the primary transform, wherein
the primary coefficient is represented by a second equation including the two-dimensional scaling factor and a secondary coefficient corresponding to the secondary transform, and
in the scaling list process, the circuitry is further configured to:
output, when the transform information indicates that the secondary transform is applied to the processing target block, a result of the second equation different from a result of the first equation; and
control, when the transform information indicates that the secondary transform is not applied to the processing target block, the two-dimensional scaling factor such that the result of the second equation becomes equal to the result of the first equation.

2. The image decoding apparatus according to claim 1, wherein the transform information includes information indicating a number of transforms applied to the processing target block.

3. The image decoding apparatus according to claim 2, wherein the circuitry is further configured to control an input into the inverse transform process based on the transform information.

4. The image decoding apparatus according to claim 1, wherein the primary transform includes a transform of prediction error data, which is a difference between the image data and predicted image data, to a frequency domain to acquire transform coefficient data.

5. The image decoding apparatus according to claim 4, wherein the secondary transform includes a transform to concentrate the transform coefficient data at a low frequency domain.

6. The image decoding apparatus according to claim 1, wherein the circuitry is further configured to determine, based on the transform information, whether to perform an inverse transform process related to an inverse transform of a specific transform different from a transform with respect to prediction error data.

7. The image decoding apparatus according to claim 6, wherein based on the determination to perform the inverse transform process, the circuitry is further configured to control an input into the scaling list process such that coefficient data after the inverse transform process becomes input data into the scaling list process.

8. The image decoding apparatus according to claim 6, wherein based on the determination to not perform the inverse transform process, the circuitry is further configured to control an input into the scaling list process such that coefficient data of the inverse quantization becomes input data into the scaling list process.

9. The image decoding apparatus according to claim 6, wherein based on the determination to perform the inverse transform process, the circuitry is further configured to specify a scaling list to be used in the scaling list process by an inner product operation of a determined scaling list and the specific transform different from the transform with respect to the prediction error data.

10. The image decoding apparatus according to claim 1, wherein the second equation includes a product of the two-dimensional scaling factor and the secondary coefficient corresponding to the secondary transform.

11. An image decoding method, comprising:
performing inverse quantization of quantized data of image data based on a first equation including a quantization parameter but not including a two-dimensional scaling factor for a scaling list process;
acquiring transform information indicating whether a secondary transform different from a primary transform is applied to a processing target block of the image data; and
performing the scaling list process to acquire a primary coefficient for an inverse transform process of the primary transform, wherein the primary coefficient is represented by a second equation including the two-dimensional scaling factor and a secondary coefficient corresponding to the secondary transform, and the performing of the scaling list process includes:
outputting, when the transform information indicates that the secondary transform is applied to the processing target block, a result of the second equation different from a result of the first equation; and controlling, when the transform information indicates that the secondary transform is not applied to the processing target block, the two-dimensional scaling factor such that the result of the second equation becomes equal to the result of the first equation.

12. A non-transitory computer-readable medium having stored thereon computer-executable instructions, that when executed by a processor of an image decoding apparatus, cause the processor to execute operations, the operations comprising:

performing inverse quantization of quantized data of image data based on a first equation including a quantization parameter but not including a two-dimensional scaling factor for a scaling list process;

acquiring transform information indicating whether a secondary transform different from a primary transform is applied to a processing target block of the image data; and performing the scaling list process to acquire a primary coefficient for an inverse transform process of the primary transform, wherein
the primary coefficient is represented by a second equation including the two-dimensional scaling factor and a secondary coefficient corresponding to the secondary transform, and the performing of the scaling list process includes:
outputting, when the transform information indicates that the secondary transform is applied to the processing target block, a result of the second equation different from a result of the first equation; and controlling, when the transform information indicates that the secondary transform is not applied to the processing target block, the two-dimensional scaling factor such that the result of the second equation becomes equal to the result of the first equation.

* * * * *